United States Patent
Khedri et al.

(10) Patent No.: US 12,401,691 B2
(45) Date of Patent: Aug. 26, 2025

(54) METHOD AND SYSTEM FOR DETERMINING DESIGN AND SEGMENTATION FOR ROBUST NETWORK ACCESS SECURITY

(71) Applicant: MCMASTER UNIVERSITY, Hamilton (CA)

(72) Inventors: Ridha Khedri, Dundas (CA); Mohammed Alabbad, Riyadh (SA); Neerja Mhaskar, Dundas (CA)

(73) Assignee: MCMASTER UNIVERSITY, Hamilton (CA)

( * ) Notice: Subject to any disclaimer, the term of this patent is extended or adjusted under 35 U.S.C. 154(b) by 67 days.

(21) Appl. No.: 18/261,401

(22) PCT Filed: Feb. 4, 2022

(86) PCT No.: PCT/CA2022/050161
§ 371 (c)(1),
(2) Date: Jul. 13, 2023

(87) PCT Pub. No.: WO2022/165599
PCT Pub. Date: Aug. 11, 2022

(65) Prior Publication Data
US 2024/0089294 A1    Mar. 14, 2024

Related U.S. Application Data

(60) Provisional application No. 63/146,024, filed on Feb. 5, 2021.

(51) Int. Cl.
*H04L 9/40* (2022.01)
*H04L 41/0894* (2022.01)
*H04L 47/70* (2022.01)

(52) U.S. Cl.
CPC .......... *H04L 63/20* (2013.01); *H04L 41/0894* (2022.05); *H04L 47/70* (2013.01); *H04L 63/0254* (2013.01); *H04L 63/10* (2013.01)

(58) Field of Classification Search
None
See application file for complete search history.

(56) References Cited

U.S. PATENT DOCUMENTS 8,020,200 B1 *   9/2011   Krohn ................. H04L 63/1441
                                                       709/224
11,968,075 B2 *  4/2024   Wang ...................... H04L 41/12
(Continued)

OTHER PUBLICATIONS

International Search Report for PCT/CA2022/050161, CIPO, international filing: Feb. 4, 2022, search completed: Apr. 2, 2022, mailed: Apr. 14, 2022.

(Continued)

*Primary Examiner* — Atta Khan
(74) *Attorney, Agent, or Firm* — Bhole IP Law; Marc Lampert

(57) ABSTRACT

Provided is a system and method for determining an arrangement of network resources to provide network access security. The method including: assigning a weight to each network resource based on the associated security policy, where a greater weighting corresponds to a requirement for a greater level of security; segmenting the network resources into subsets if a operator acting on the network resource with other network resources in the subset has equal or more combined weight than the combined weight of the operator acting on the network resource with other network resources not in the subset; generating a network topology by adding subsets to nodes in the network graph in descending order by weight until one of the one or more access points is reached, where vertices between nodes are firewalled.

16 Claims, 19 Drawing Sheets

(56) References Cited

U.S. PATENT DOCUMENTS

| | | | |
|---|---|---|---|
| 2012/0066368 A1* | 3/2012 | Li | H04L 9/40 |
| | | | 709/241 |
| 2015/0180778 A1* | 6/2015 | Shraer | H04L 49/356 |
| | | | 370/238 |
| 2018/0115470 A1* | 4/2018 | Huang | H04L 41/0894 |
| 2018/0324219 A1* | 11/2018 | Xie | H04L 63/0209 |

OTHER PUBLICATIONS

Written Opinion for PCT /CA2022/050161, CIPO, international filing: Feb. 4, 2022, opinion completed: Apr. 8, 2022, mailed: Apr. 14, 2022.

"Installing POX", Installing POX—POX Manual Current documentation. (n.d.). https://github.com/noxrepo/pox-doc/blob/master/docs/html/index.html.

Alabbad, Mohammed, "A Formal Approach to Secure the Segmentation and Configuration of Dynamic Networks", (2021) Doctoral thesis, Department of Computing and Software and the School of Graduate Studies, McMaster University.

Alabbad, Mohammed, et al., "Configuration and Governance of Dynamic Secure SDN", Procedia Computer Science, vol. 184, 2021, pp. 131-139, ISSN 1877-0509, https://doi.org/10.1016/j.procs.2021.03.024.

Balasubramanian, Venkatraman, et al., "Managing the mobile Ad-hoc cloud ecosystem using software defined networking principles", 2017 International Symposium on Networks, Computers and Communications (ISNCC), Marrakech, Morocco, 2017, pp. 1-6, doi: 10.1109/ISNCC.2017.8072033.

Bellavista, Paolo, et al., "SDN-Based Traffic Management Middleware for Spontaneous WMNs", J Netw Syst Manage 28, 1575-1609 (2020). https://doi.org/10.1007/s10922-020-09551-y.

Berde, Pankaj, "ONOS: towards an open, distributed SDN OS", HotSDN '14: Proceedings of the third workshop on Hot topics in software defined networking, Aug. 2014, pp. 1-6, https://doi.org/10.1145/2620728.2620744.

Bianchi, Giuseppe, et al., "OpenState: Programming Platform-independent Stateful OpenFlow Applications Inside the Switch", (2014). ACM SIGCOMM Computer Communication Review, 44(2), 44-51. https://doi.org/10.1145/2602204.2602211.

Da Silva, Lucas Soares, et al., "A Dynamic Load Balancing Algorithm for Data Plane Traffic", 9th Latin American Network Operations and Management Symposium, LANOMS 2019, Niterói, Rio de Janeiro, Brazil, Sep. 25-27, 2019, FIP Open Digital Library, ISBN: 978-3-903176-23-2.

Dargahi, Tooska, et al., "A Survey on the Security of Stateful SDN Data Planes", in IEEE Communications Surveys & Tutorials, vol. 19, No. 3, pp. 1701-1725, third quarter 2017, doi: 10.1109/COMST.2017.2689819.

De Oliveira, Rogério Leão Santos, et al., "Using Mininet for emulation and prototyping Software-Defined Networks", 2014 IEEE Colombian Conference on Communications and Computing (COLCOM), Bogota, Colombia, 2014, pp. 1-6, doi: 10.1109/ColComCon.2014.6860404.

Deng, Juan, et al., "VNGuard: An NFV/SDN combination framework for provisioning and managing virtual firewalls", J. et al., ",", 2015 IEEE Conference on Network Function Virtualization and Software Defined Network (NFV-SDN), San Francisco, CA, USA, 2015, pp. 107-114, doi: 10.1109/NFV-SDN.2015.7387414.

Höfner, Peter, et al., "Algebraic View Reconciliation", 2008 Sixth IEEE International Conference on Software Engineering and Formal Methods, Cape Town, South Africa, 2008, pp. 85-94, doi: 10.1109/SEFM.2008.36.

Höfner, Peter, et al., "An algebra of product families", Softw Syst Model 10, 161-182 (2011). https://doi.org/10.1007/s10270-009-0127-2.

Höfner, Peter, et al., "Feature Algebra", (2006). 300-315. DOI: 10.1007/11813040_21.

Jandera, Kai, et al., "Practical defense-in-depth solution for Microservice Systems", (2019). Journal of Ubiquitous Systems and Pervasive Networks, 11(1), 17-25. https://doi.org/10.5383/juspn.11.01.003.

Jaskolka, Jason, et al., "A Formulation of the Potential for Communication Condition using C2KA", (2014). ArXiv. https://doi.org/10.4204/EPTCS.161.15.

Jaskolka, Jason, et al., "Mitigating covert channels based on analysis of the potential for communication", (2016). Theoretical Computer Science, 643, 1-37. https://doi.org/10.1016/j.tcs.2016.06.022.

Jaskolka, Jason, et al., "On the Necessary Conditions for Covert Channel Existence: A State-of-the-Art Survey", Procedia Computer Science, vol. 10, 2012, pp. 458-465, ISSN 1877-0509, https://doi.org/10.1016/j.procs.2012.06.059.

Kaljic, Enio, et al., "A Survey on Data Plane Flexibility and Programmability in Software-Defined Networking", IEEE Access, vol. 7, pp. 47804-47840, 2019, doi: 10.1109/ACCESS.2019.2910140.

Khedri, Ridha, et al., "An Algebraic Approach Towards Data Cleaning", (2013). Procedia Computer Science, 4th International Conference on Emerging Ubiquitous Systems and Pervasive Networks (EUSPN) / 3rd International Conference on Current and Future Trends of Information and Communication Technologies in Healthcare (ICTH).

Khedri, Ridha, et al., "Defense in Depth Formulation and Usage in Dynamic Access Control", (2017). In: Maffei, M., Ryan, M. (eds) Principles of Security and Trust. POST 2017. Lecture Notes in Computer Science(), vol. 10204. Springer, Berlin, Heidelberg. https://doi.org/10.1007/978-3-662-54455-6_12.

Khedri, Ridha, et al., "On the Segmentation of Networks", (2019). CAS Report Series, CAS-19-01-RK, Department of Computing and Software, McMaster University.

Ku, Ian, et al., "Software-Defined Mobile Cloud: Architecture, services and use cases", 2014 International Wireless Communications and Mobile Computing Conference (IWCMC), Nicosia, Cyprus, 2014, pp. 1-6, doi: 10.1109/IWCMC.2014.6906323.

Kubo, Rui, et al., "Ryu SDN Framework—Open-source SDN Platform Software", NTT Technical Review, vol. 12 No. 8 Aug. 2014, https://www.ntt-review.jp/archive/ntttechnical.php?contents=ntr201408fa4.html.

Kumar, Rakesh, et al., "On cloud security requirements, threats, vulnerabilities and countermeasures: A survey", (2019). Computer Science Review, 33, 1-48. https://doi.org/10.1016/j.cosrev.2019.05.002.

Leclair, Andrew, et al., "Formalizing Graphical Modularization Approaches for Ontologies and the Knowledge Loss", (2019). (originally published as "Toward Measuring Knowledge Loss due to Ontology Modularization"). In Proc. of the 11th IC3K (IC3K 2019)—IC3K 2019, vol. 1297. pp. 388-412, Springer, Cham. https://doi.org/10.1007/978-3-030-66196-0_18.

Lorenz, Claas, et al., "An SDN/NFV-Enabled Enterprise Network Architecture Offering Fine-Grained Security Policy Enforcement", IEEE Communications Magazine, vol. 55, No. 3, pp. 217-223, Mar. 2017, doi: 10.1109/MCOM.2017.1600414CM.

Marinache, Alicia, et al., "DIS: A Data-centred Knowledge Representation Formalism", 2021 Reconciling Data Analytics, Automation, Privacy, and Security: A Big Data Challenge (RDAAPS), Hamilton, ON, Canada, 2021, pp. 1-8, doi: 10.1109/RDAAPS48126.2021.9452007.

Mhaskar, Neerja, et al., "A Formal Approach to Network Segmentation", Computers & Security, vol. 103, 2021, 102162, ISSN 0167-4048, https://doi.org/10.1016/j.cose.2020.102162.

Misra, Jayadev, et al., (2006). Lecture Notes in Computer Science. https://doi.org/10.1007/11813040 .

Patel, Vishv, et al., "Emerging technologies and applications for Smart Cities", (2021). Journal of Ubiquitous Systems and Pervasive Networks, 15(02), 19-24. https://doi.org/10.5383/juspn.15.02.003.

Pfaff, Ben, et al., "The design and implementation of open vSwitch", NSDI'15: Proceedings of the 12th USENIX Conference on Networked Systems Design and Implementation, May 2015, pp. 117-130.

(56) References Cited

OTHER PUBLICATIONS

Schaller, Sibylle, et al., "Software defined networking architecture standardization", Computer Standards & Interfaces, vol. 54, Part 4, 2017, pp. 197-202, ISSN 0920-5489, https://doi.org/10.1016/j.csi.2017.01.005.

Sufiev, Hadar, et al., "Dynamic SDN Controller Load Balancing", Future Internet. 2019; 11(3):75. https://doi.org/10.3390/fi11030075.

Wang, Tao, et al., "Dynamic SDN controller assignment in data center networks: Stable matching with transfers", IEEE Infocom 2016—The 35th Annual IEEE International Conference on Computer Communications, San Francisco, CA, USA, 2016, pp. 1-9, doi: 10.1109/INFOCOM.2016.7524357.

Yu, Hans C., et al., H. C. Yu, G. Quer and R. R. Rao, "Wireless SDN mobile ad hoc network: From theory to practice," 2017 IEEE International Conference on Communications (ICC), Paris, France, 2017, pp. 1-7, doi: 10.1109/ICC.2017.7996340.

Zhu, Liehuang, et al., "SDN Controllers: Benchmarking & Performance Evaluation", (2019). ArXiv. / abs/1902.04491.

* cited by examiner

METHOD AND SYSTEM FOR DETERMINING DESIGN AND SEGMENTATION FOR ROBUST NETWORK ACCESS SECURITY

TECHNICAL FIELD

The following relates generally to computer network security, and more specifically, to a method and system for determining design and segmentation for robust network access security.

BACKGROUND

Computer networks generally consist of connected communicating resources that are protected by a security system. The goal of this system is to ensure proper access to resources and to enhance their availability and integrity. Firewalls play an important role in this security system by enforcing security policies that enable only legitimate users to access resources. Other mechanisms, such as an Intrusion Detection System (IDS), can also be a part of the security system. Firewalls are network security devices that monitor incoming and outgoing network traffic and decide whether to allow or block specific traffic based on given security rules. In some cases, an organization could have up to hundreds of firewalls scattered around its network. The placement of firewalls and their policies play a key role in their effectiveness. In most practices, a network administrator decides the placement and configuration of firewalls. However, for a large network, this task on network administrators becomes extremely difficult to implement efficiently.

The operation of determining which set of resources to be placed under each of the firewalls is commonly referred to as segmentation. Network security policies are deployed on network devices that could be switches or firewalls. While in traditional networks the network devices encompass the control plane and the forwarding plane, in software-defined networking (SDN), there is a separation between these planes. This decoupling of the two planes enhances the modifiability due to the separation of concerns; the control is separated from the forwarding.

SUMMARY

In an aspect there is provided a method for determining an arrangement of network resources to provide network access security, the network having one or more access points to externally access the network, each network resource having an associated security policy, the method executed on at least one processing unit, the method comprising: receiving information of the network resources and the one or more access points; assigning a weight to each network resource based on the associated security policy, where a greater weighting corresponds to a requirement for a greater level of security; segmenting the network resources into subsets, where a network resource is associated with a given subset if an operator acting on the network resource with other network resources in the subset has equal or more combined weight than the combined weight of the operator acting on the network resource with other network resources not in the subset; generating a network topology by adding subsets to nodes in the network topology in descending order by weight until one of the one or more access points is reached, where security policies at a given node are a refinement of the security policies at an ancestor node of the given and where vertices between nodes are firewalled; and outputting the network topology for implementation.

In a particular case of the method, the operator comprises a greatest common divisor (GCD) operator.

In another case of the method, the operator comprises a $\oplus$ operator.

In yet another case of the method, the method further comprising transforming each policy into a set of rules that are atomic and based on security requirements or security situation, and wherein the weight of each security policy is the sum of the weights of the atomic rules of such security policy.

In yet another case of the method, the atomic rule is modelled as a transition relation from a starting state to one or more end states.

In yet another case of the method, the security policies for a plurality of the network resources are combined into a family of policies. P In yet another case of the method, the method further comprising removing network resources with an associated nonexecutable policy ($0_{\mathcal{F}}$) policy.

In yet another case of the method, the method further comprising removing network resources with an associated non-enforced ($1_{\mathcal{F}}$) policy.

In yet another case of the method, the method further comprising adding network resources with the associated non-enforced ($1_{\mathcal{F}}$) policy to an access point of the network.

In yet another case of the method, the firewall at each node of the network topology comprises a single and centralised stateful firewall at a control plane.

In yet another case of the method, the firewall at each node of the network topology comprises a plurality of distributed stateful firewalls located at the control plane.

In yet another case of the method, the firewall at each node of the network topology comprises a plurality of distributed stateful firewalls located at the data plane.

In another aspect, there is provided a system for determining an arrangement of network resources to provide network access security, the network having one or more access points to externally access the network, each network resource having an associated security policy, the system comprises at least one processing unit and a data storage media in communication with the at least one processing unit and having executable instructions stored thereon, the at least one processing unit configured to execute: an input module to receive information of the network resources and the one or more access points; a weighting module to assign a weight to each network resource based on the associated security policy, where a greater weighting corresponds to a requirement for a greater level of security; a segmentation module to segment the network resources into subsets, where a network resource is associated with a given subset if an operator acting on the network resource with other network resources in the subset has equal or more combined weight than the combined weight of the operator acting on the network resource with other network resources not in the subset; a graph module to generate a network topology by adding subsets to nodes in the network topology in descending order by weight until one of the one or more access points is reached, where security policies at a given node are a refinement of the security policies at an ancestor node of the given and where vertices between nodes are firewalled; and an output module to output the network topology for implementation by the network.

In a particular case of the system, the operator comprises a greatest common divisor (GCD) operator.

In another case of the system, the operator comprises a $\oplus$ operator.

In yet another case of the system, transforming each policy into a set of rules that are atomic and based on security requirements or security situation, and wherein the weight of each security policy is the sum of the weights of the atomic rules of such security policy.

In yet another case of the system, the atomic rule is modelled as a transition relation from a starting state to one or more end states.

In yet another case of the system, the security policies for a plurality of the network resources are combined into a family of policies.

In yet another case of the system, the segmentation module further removes network resources with an associated nonexecutable policy ($0_F$) policy.

In yet another case of the system, the segmentation module further removes network resources with an associated non-enforced ($1_F$) policy.

In yet another case of the system, the graph module further adds network resources with the associated non-enforced ($1_F$) policy to an access point of the network.

In yet another case of the system, the weighting module, the segmentation module, and the graph module conceptually operate on a dynamic configuration and governance (DCG) plane, and wherein the firewall at each node of the network topology comprises a single and centralised stateful firewall at a control plane.

In yet another case of the system, the weighting module, the segmentation module, and the graph module conceptually operate on a dynamic configuration and governance (DCG) plane, and wherein the firewall at each node of the network topology comprises a plurality of distributed stateful firewalls located at the control plane.

In yet another case of the system, the weighting module, the segmentation module, and the graph module conceptually operate on a dynamic configuration and governance (DCG) plane, and wherein the firewall at each node of the network topology comprises a plurality of distributed stateful firewalls located at the data plane.

These and other embodiments are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
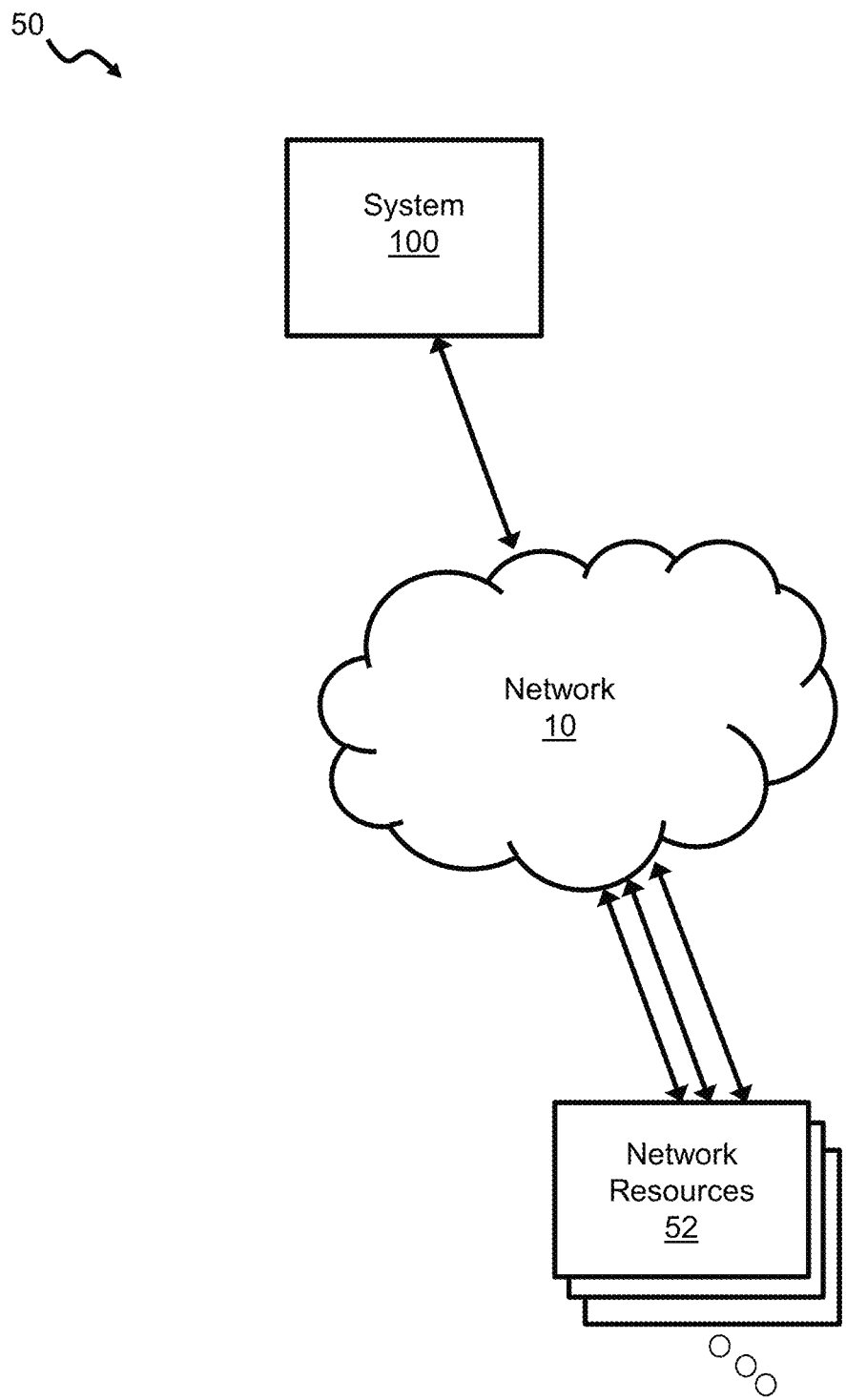
FIG. 1 is a schematic diagram of an environment for a system for determining an arrangement of network resources to provide network depth security.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor, as a plurality of processors, as a multi-core and/or multi-threaded processors, or the like. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to computer network security, and more specifically, to a method and system for determining design and segmentation for network depth security.

Generally, the placement of firewalls is determined by a network administrator based on network security design principles and best practices. A design principle that is generally adhered to when creating subnetworks and placing firewalls is the separation of concern. This is usually achieved through compartmentalization or segmentation: resources of different security levels and requirements are placed in different zones protected by firewalls implementing appropriate policies. However, generally, the criteria used for compartmentalizing a network is articulated vaguely. A good network security should adhere to the principle of least privilege: giving just enough access privileges to perform a task. For example, a request from the public should have access to only public facing resources but not internal resources. Additionally, requests from internal resources should be managed by internal firewalls. Segmentation can be used as a way to implement the principle of least privilege.

Another strategy is the use of layered protection, where the security of the network is not relied on one single access control point but multiple layers complementing each other to provide maximum security. The layered protection is achieved by a Defense in Depth (DD) strategy. Intuitively, a network implements DD strategy if it has at least two layers of protection, such that going from one layer to the other is faced by policies that are more restrictive or at least as restrictive as the policies of the layer before it.

Some approaches place low security level resources, or the resources that are more permissive for outside access than others, in a special subnetwork called a Demilitarized Zone (DMZ). The use of DMZ is a manifestation of the principles of separation of concern and least privilege and defense in depth strategy. DMZ is an intermediate network between the outer network and the internal networks. It is usually for the public facing services and systems. It is a mechanism to protect internal networks from outside access. An access from outside is faced by the outer firewall. An access from the DMZ to internal networks is managed by internal firewalls with more strict policies.

Firewalls inspect network traffic (packets) and perform actions on it based on the rules, and the actions specified therein. Typically, firewalls perform two actions, one to let the network traffic pass and the other to block it. However, some firewalls perform more actions. For example, in iptables (iptables is a command line utility program for configuring Linux kernel firewall) the following four actions can be performed: ACCEPT, LOG, REJECT, and DROP. ACCEPT allows the packet to pass, while REJECT and DROP both block the packet. In addition to blocking the packet, REJECT also sends an error message to the requester, thereby acknowledging the receipt of the packet. LOG, simply records the request in syslog files.

Embodiments of the present disclosure use Product Family Algebra (PFA), which treats policies as related product families, and use a theory of Guarded Commands, which deals with rules of policies and their conditions and actions. In addition, embodiments of the present disclosure use DD and SDD strategy.

Referring now to FIG. 1, a diagrammatic operating environment for a system 100 for determining an arrangement of network resources to provide robust network access security, in accordance with an embodiment, is shown. The system 100 can be operated on any suitable computing device that is part of or in communication with a network administrative device that is communication with network devices, such as switches and servers. In some embodiments, the components of the system 100 are stored by and executed on a single computer system. In other embodiments, the components of the system 100 can be distributed among two or more computer systems that may be locally or remotely distributed.

Figure 2:
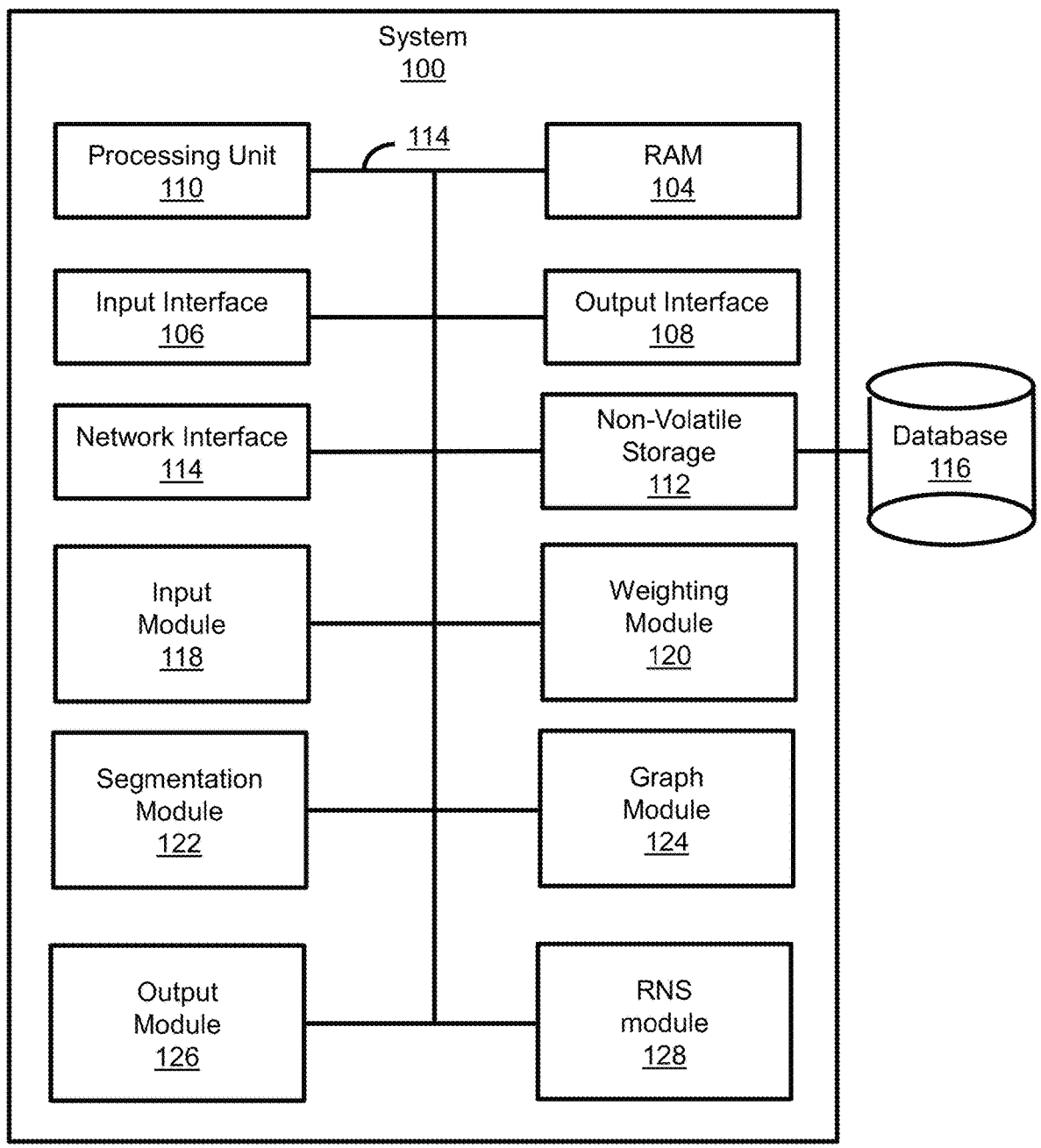
FIG. 2 is a schematic diagram for the system for determining an arrangement of network resources to provide robust network access security, in accordance with an embodiment.

FIG. 2 shows an embodiment of the system 100 including various physical and logical components. As shown, the first computing device 102 has a number of physical and logical components, including a processing unit 110 (comprising one or more processors), an input interface 106, an output interface 108, a network interface 114, data storage media, and a local bus 114 enabling the processing unit 110 to communicate with the other components. The data storage media including random access memory ("RAM") 104, non-volatile storage 112, and/or a database 116. The processing unit 110 executes an operating system, and various modules, as described below in greater detail. RAM 104 provides relatively responsive volatile storage to the processing unit 110. The input interface 106 enables an administrator or user to provide input via an input device, for example a keyboard and mouse. The output interface 108 outputs information to output devices, such as a display and/or speakers. The network interface 114 permits communication with other devices over the network 130, or other computing devices and servers remotely located from the system 100. Non-volatile storage 112 stores the operating system and programs, including computer-executable instructions for implementing the operating system and modules, as well as any data used by these services. Additional stored data can be stored in the database 116. During operation of the system 100, the operating system, the modules, and the related data may be retrieved from the non-volatile storage 112 and placed in RAM 104 to facilitate execution. In an embodiment, the first computing device 102 further includes a number of conceptual modules, including an input module 118, a weighting module 120, a segmentation module 122, a graph module 124, an output module 126, and an RNS module 128. In some cases, the modules 118, 120, 122, 124, 126, 128 can be executed on the processing unit 110. In further cases, some of the functions of the modules 118, 120, 122, 124, 126, 128 can be executed on other devices. In some cases, some or all of the functions of any of the modules 118, 120, 122, 124, 126, 128 can be combined with other modules or part of other modules.

A variant of Dijkstra's guarded command can be used to model policies. A command is a transition relation from starting states to their successor states, and a set of states that do not lead to failure, and formally defined as follows: for a set $\Sigma$ of states, a command over $\Sigma$ is a pair (R, P) where $R \subseteq \Sigma \times \Sigma$ is a transition relation and P is a subset of 2 that is intended to characterize those states from which the command cannot lead to abortion/failure. The command abort is the one that offers no transition and does not guarantee the absence of abortion/failure for any state, and is defined as:

$$\text{abort} \stackrel{def}{=} (\emptyset, \emptyset)$$

For a command (R,P) and a set of states $Q \subseteq \Sigma$, the guarded command $Q \rightarrow (R, P)$ (where Q is called the guard) is defined as:

$$Q \rightarrow (R, P) \stackrel{def}{=} (Q \downarrow R, \overline{Q} \cup P),$$

where $Q \downarrow R$ is the restriction of R to Q defined as $$Q \downarrow R \stackrel{def}{=} R \cap (Q \times \Sigma)$$

and $\overline{Q}$ is the complement of Q w.r.t. $\Sigma$. For the set of states from which the guarded command does not lead to abortion, we augment the set P by the complement of Q; that is, by $\overline{Q}$. The reason is that outside of the set of states Q (i.e., $\overline{Q}$) the command cannot be executed and therefore there is no possibility of abortion or failure.

In the context of access control policies, an atomic rule is a feature (and hence indivisible) and modelled as a guarded command. A policy is a set of rules or a single rule obtained by combining various rules. For example, let $\Sigma = S \times P \times St \times Dport \times A$, where S is the set of all possible source IP numbers, P is the set of all possible protocols, St is the set of connection states, Dport is the set of destination ports, and A is the set of actions, respectively. The sets S, P, St, Dport, and Á are the state attributes. Denoted by $\mathbb{L}$ is the universal relation on this space. Then, the rule of the policy can be written as C1=[Q→(R,P)], where $Q \subseteq \Sigma$ is the guard defined as {(s,p,st,dport,a)|st∈{RELATED,ESTABLISHED}}, and $\overline{Q}$ is {(s,p,st,dport,a)|st∉{RELATED,ESTABLISHED}}.

The relation R can be defined in this case as R={((s, p, st, dport, a), (s', p', st', dport', a))|a'=ACCEPT}. Since the domain of the relation R is E with no restrictions, it cannot be guaranteed that the absence of abortion for any state. Therefore, take P=∅. After applying the definition of the guarded commands, the relation R' of the rule is: R'={((s, p, st, dport, a), (s', p', st', dport', a'))|(st∈{RELATED, ESTABLISHED})∧a'=ACCEPT}. The other rules of the policy can be treated analogously.

Example Policy 1

1—A INPUT-m state- -state RELATED,ESTABLISHED-j ACCEPT
2—A INPUT-m state- -state INVALID-j DROP
3—A INPUT-p tcp-m state- -state NEW-m tcp- -dport 80-j ACCEPT
4—A INPUT-p tcp-m state- -state NEW-m tcp- -dport 25-j ACCEPT
5—A INPUT-s 192.168.1.0/24-j ACCEPT
6—A INPUT-s 192.168.2.0/24-j ACCEPT
7—A INPUT-s 192.168.3.0/24-j ACCEPT
8—A INPUT-s 192.168.4.0/24-j ACCEPT
9—A INPUT-j DROP Note that Example Policy 1, which is a web server and email server policy, can be as a set of rules or a single rule obtained by combining the relations of the rules as follows:
R_web={(((s,p,st,dport,a),(s',p',st',dport',a'))|
(st∈{RELATED,ESTABLISHED})∧a'=ACCEPT
∨(st∉{RELATED,ESTABLISHED,NEW}∧a'=DROP)
∨(p=TCP ∧st=NEW∧dport∈{80,25}∧a'=ACCEPT)
∨(s∈{192.168.1.0/24,192.168.2.0/24,192.168.3.0/24, 192.168.4.0/24}
∧a'=ACCEPT)
∨(s∉{192.168.1.0/24,192.168.2.0/24,192.168.3.0/24, 192.168.4.0/24}
∧p≠TCP∧st=NEW∧a'=DROP)
∨(s∉{192.168.1.0/24,192.168.2.0/24,192.168.3.0/24, 192.168.4.0/24}
∧p=TCP∧st=NEW∧dport∉{80,25}∧a'∉DROP)}
Command (R, P) refines command (S, Q) and as such:

$$(R, P) \sqsubseteq (S, Q) \stackrel{def}{\Leftrightarrow} Q \subseteq P \wedge_Q \downarrow R \subseteq S.$$

The greatest lower bound of commands (R, P) and (S, Q) w.r.t. $\sqsubseteq$ is the demonic meet which is defined as:

$$(R,P) \sqcap (S,Q) = ((R \cap S) \cup (\overline{P} \leftarrow S) \cup (\overline{Q} \leftarrow R), P \cup Q)$$

The demonic meet for the commands (R, dom(R)) and (S, dom(S)) is defined iff dom(R∩s)=dom(R)∩dom(S). In other terms, the demonic meet of the commands (R, dom(R)) and (S, dom(S)) is defined iff R and S agree on the action to be carried on their common domain. This property is called integrability. The least upper bound of commands (R, P) and (S, Q) w.r.t. $\sqsubseteq$ is the demonic join which is defined as:

$$(R,P) \sqcup (S,Q) = ((R \cup S) \cap (dom(R) \times \Sigma) \cap (dom(S) \times \Sigma), P \cap Q)$$

The demonic join coincides with what is later called the Greatest Common Divisor (GCD).

Let R1 and R2 be the relations of policies P1 and P2 respectively:
$R_1$={(((s,p,st,dport,a),(s',p',st',dport',a'))|
(s=192.168.1.0/24∧a'=ACCEPT)
∨(s=192.168.2.0/24∧a'=REJECT)
∨(s=192.168.3.0/24∧a'=ACCEPT)
$R_2$={(((s,p,st,dport,a),(s',p',st',dport',a'))|
(s=192.168.1.0/24∧a'=ACCEPT)
∨(s=192.168.2.0/24∧a'=ACCEPT)
∨(s=192.168.4.0/24∧a'=ACCEPT)
Then, the demonic join of ($R_1$) and ($R_2$) is as follows:
($R_1 \sqcup R_2$)={(((s,p,st,dport,a),(s',p',st',dport',a'))|
(s=192.168.1.0/24∧a'=ACCEPT)
∨(s=192.168.2.0/24..(a'=ACCEPT∨a'=REJECT))

Product Family Algebra (PFA) is a commutative idempotent semiring (S, +, ·, 0, 1), where S is a set of product families. The binary operators + and · are interpreted as the alternative choice between two product families and the mandatory composition of two product families, respectively. The constant 0 corresponds to an empty product family, and the constant 1 corresponds to a product family consisting of only a pseudo-product with no features; that is, no access-control rules. A product is a family that is indivisible with regards to +operator. A feature is a product that is indivisible with regards to · operator.

There can be a divisibility relation among families (a|b)⇔(∃c|·b=a·c), which allows the system to find divisors of families; and therefore, find the GCD. The GCD is the common divisor that is divided by all other common divisors. Hence, the following property holds: GCD(a, b)=d such that the following condition is satisfied: ((d|a)∧(d|b) ∧((∀c|·(c|a)∧(c|b))⇒(c|d)). Finding the commonalities of two families is formalized by finding the GCD. For two families, a and b, they are coprime policies if GCD(a, b)=1. The annihilating element of GCD is 1 such that for any family a the GCD (1, a)=1. The GCD(a,0)=a, as we have a·0=a, and therefore a|0.

For firewall policies as product families, the commutative idempotent structure $\mathcal{F}$ can be presented as a model for PFA where $\mathcal{F} =(\mathcal{P}\ (\mathbb{P}),\oplus,\odot,0_\mathcal{F},1_\mathcal{F})$ is a product family algebra, and where:

1) $\left(\forall A, B \mid A, B \in \mathcal{P}\ (\mathbb{P}) \rightarrow A \oplus B \stackrel{def}{=} A \cup B\right)$ 2) $\left(\forall A, B \mid A, B \in \mathcal{P}\ (\mathbb{P}) \rightarrow A \odot B \stackrel{def}{=} \{a \sqcap_p b \mid a \in A \wedge b \in B\}\right)$ 3) $0_\mathcal{F} \stackrel{def}{=} \emptyset$ 4) $1_\mathcal{F} \stackrel{def}{=} \{\{abort\}\}$ Let $\mathbb{P}$ be a set of policies. Then, an element of $\mathcal{P}\ (\mathbb{P})$ is a family of policies. Where $\oplus$ is the union of policy families and represents the choice of families and $\odot$ is the demonic meet of the policies of the families and represents the integration of families. $0_\mathcal{F}$ is an nonexecutable policy, and $1_\mathcal{F}$ is a non-enforced policy that enforces nothing and so is refined by all policies. Hence, $0_\mathcal{F}$ is the annihilator element for the operator $\odot$ and $1_\mathcal{F}$ is the neutral element for the operator $\odot$.

On a product family, $\leq_\mathcal{F}$ denotes the natural order that comes with the semiring structure for $\mathcal{F}$. It is defined as:

$$a \leq_\mathcal{F} b \stackrel{def}{\Leftrightarrow} a \oplus b = b.$$

Hence, the notion of family refinement of the elements of $\mathcal{F}$ is defined as:

$$a \sqsubseteq_\mathcal{F} b \stackrel{def}{\Leftrightarrow} (\exists c \mid \cdot a \leq_\mathcal{F} b \odot c).$$

Figure 4:
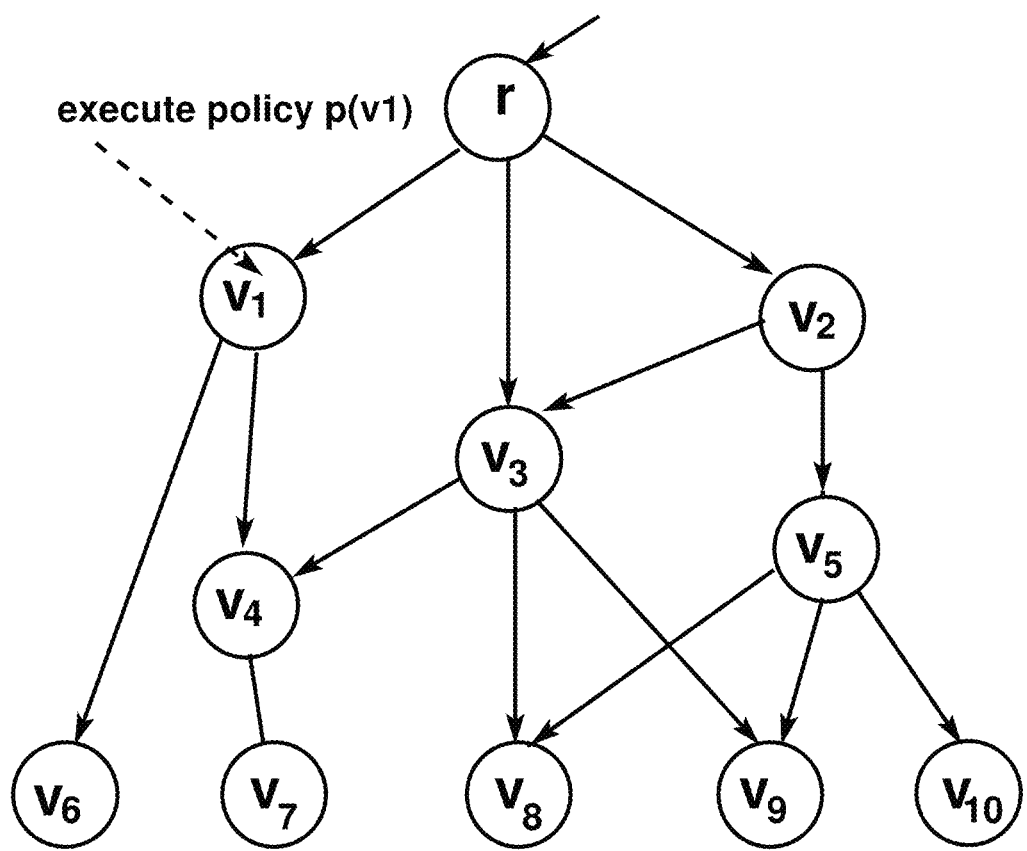
FIG. 4 is a diagram of an example of a rooted connected directed acyclic graph model of a network that has a root, internal access points and leaves.

The GCD defined under PFA is equivalent to the demonic join of the families of policies and can be restated as:

$$\left(\forall A, B \mid A, B \in \mathcal{P}\ (\mathbb{P}) \cdot gcd(A, B) \stackrel{def}{=} \{a \sqcup_p b \mid a \in A \wedge b \in B\}\right).$$

where $\sqcup_\mathbb{P}$ is the extension of $\sqcup$ to accommodate families of policies, For Defense in Depth (DD), a network with an outer access control point r (i.e., firewall) can be represented as a directed acyclic graph. The leaves represent the resources, and the other vertices represent internal firewalls. FIG. 4 shows an example graph model of a network that has a root r, internal access points $v_1$ to $v_5$ and leaves $v_6$ to $v_{10}$. The leaves represent resources that also can enforce local policies. The edges represent traffic links. For example, in FIG. 4, the edge $(v_2,v_3)$ indicates the connection from $v_2$ to $v_3$.

Let $$G \stackrel{def}{=} (V, E, r)$$

be a rooted connected directed acyclic graph that represents a resource network. The set V denotes the set of vertices or access control points that enforce access policies (i.e., firewalls and resources). The set E is a set of ordered pairs of vertices that represent the link between access control points. The vertex r is the root of the graph and it represents the access point between the network and the external world. To guarantee the absence of conflicts in the policies of a network G, any edge between two access control points should respect the refinement property of being more restrictive in policy. For example, if the edge (v2,v3)∈ E then the family of policies implemented at v2 is refined by the policy at v3. Therefore, the family of policies at a node is a refinement of the policies at its ancestor nodes.

For Defence in Depth Law (DDL), let $$G \stackrel{def}{=} (V, E, r)$$

be a network of access control points. Denote p(v) as the family of policies enforced at vertex v in G. The network G employs a DD strategy if:

$$p(r) \neq 0_\mathcal{F} \wedge (\forall a,b|(a,b) \in E \cdot p(b) \sqsubseteq_\mathcal{F} p(a))$$

Let $$G \stackrel{def}{=} (V, E, r)$$

be a network access control points and let T be a spanning tree of G rooted at r. Let L be the set of leaf nodes, where each leaf l∈ L is assigned a policy p(l). Two schemes, in some cases, can be used to generate the policies of the internal nodes such that the network implements a DD strategy. Each scheme uses an operator that acts on network resource, with other network resources in the subset, to determine if it has equal or more combined weight than the combined weight of such operator acting on the network resource with other network resources not in the subset. The first scheme uses the GCD operator to generate the policies of the internal nodes such that network implements a DD strategy, and the following property holds for an internal node v: $p(v)=(gcd\ v_i|(v,v_i) \in E \cdot p(v_i))$. The general form of the notation is *(x|R:P), where * is the quantifier, x is the dummy or quantified variable, R is predicate representing the range, and P is an expression representing the body of the quantification. An example of the notation is $(+i| 1 \leq i \leq 3 \cdot i^2) = (1^2+2^2+3^2)$. If the range of the quantification is empty then the quantification returns the neutral value $\mathbb{L}$ for GCD; that is, GCD $(x, \mathbb{L})=x$, which is the universal relation on the space of the policies. The second scheme uses a $\oplus$ operator with the condition of integrability. Using these schemes, the assignment of policies starts from the lowest level of the tree up to the root.

A network, G, could have multiple spanning trees $T_1 \ldots T_n$, where for each tree $T_i$, $1 \leq i \leq n$, the family of policies at an internal node can be computed using either the GCD or $\oplus$ operator. Also note that, an internal node could be a node in multiple spanning trees, say $T_{j_1} \ldots T_{j_k}$. In this case, the family of policies implemented at such a node v is $p(v) = (GCD\ i | 1 \leq is\ k \cdot p_i(v))$, where $p_i(v)$ is the family of policies for the node v in the spanning tree $T_i$.

Strict defense in depth can be used as a base for network segmentation. A stricter form of DD can be defined by strengthening the condition of refinement. Let $$G \stackrel{def}{=} (V, E, r)$$

be a network of access control points. The network G employs an SDD strategy if:

$p(r) \neq 0_{\mathcal{F}} \wedge (\forall a, b | (a,b) \in E \cdot p(b) \sqsubset_{\mathcal{F}} p(a))$, where $p(b) \sqsubset_{\mathcal{F}} p(a) \Leftrightarrow (p(b) \sqsubseteq_{\mathcal{F}} p(a) \wedge p(a) \neq p(b))$.

The Strict Defense in Depth (SDD) is a stronger form of DD. SDD is obtained from DD by replacing $\sqsubseteq_{\mathcal{F}}$ by its strict form $\sqsubset_{\mathcal{F}}$ where we exclude the case where the families of policies on successive nodes are equal.

Let $$G \stackrel{def}{=} (V, E, r)$$

be a network or access control points and $$S \stackrel{def}{=} \{v \mid v \in V \wedge (r, v) \in E\}$$

be the set of vertices connected to the root r. Let T be a spanning tree of G rooted at r. Every leaf node $l \in L$ is assigned a family of policies p(l). If the families of policies of the internal vertices are generated such that G implements SDD, the following lemmas present cases when SDD is not achievable in the network.

Lemma 1. Let T be a spanning tree of height greater than 2. If T has a leaf $l \not\in S$, such that $p(l)=1_{\mathcal{F}}$, then it is impossible to have an SDD implementation using the GCD scheme. Formally:

---

$(\exists l \mid l \in L \cdot p(l) = 1_F)$
$\Rightarrow$
$\neg(p(r) \neq 0_{\mathcal{F}} \wedge (\forall a, b \mid (a, b) \in E \cdot p(b) \sqsubset_{\mathcal{F}} p(a)))$
Proof of Lemma 1.
$\neg(p(r) \neq 0_{\mathcal{F}} \wedge (\forall a, b \mid (a, b) \in E \cdot p(b) \sqsubset_{\mathcal{F}} p(a)))$
$\Leftrightarrow \langle$ De Morgan Law $\rangle$
$(p(r) = 0{\mathcal{F}}) \vee (\exists a, b \mid (a, b) \in E \cdot p(b) \not\sqsubset_{\mathcal{F}} p(a))$
$\Rightarrow \langle$ Strengthening $\rangle$
$(\exists a, b \mid (a, b) \in E \cdot p(b) \not\sqsubset_{\mathcal{F}} p(a))$
$\Leftarrow \langle (v, l) \in E \rangle$
$p(l) \not\sqsubset_{\mathcal{F}} p(v)$
$\Leftrightarrow \langle p(v) = \gcd(p(v), p(l)) \rangle$
$p(l) \not\sqsubset_{\mathcal{F}} \gcd(p(v), p(l))$
$\Leftrightarrow \langle$ From the hypothesis $p(l) = 1_{\mathcal{F}} \rangle$
$1_{\mathcal{F}} \not\sqsubset_{\mathcal{F}} \gcd(p(v), 1_{\mathcal{F}})$
$\Leftrightarrow \langle$ Because $\gcd(p(v), 1_{\mathcal{F}}) = 1_{\mathcal{F}}$, v is parent of l $\rangle$
$1_{\mathcal{F}} \not\sqsubset_{\mathcal{F}} 1_{\mathcal{F}}$
$\Leftarrow \langle$ From the definition of $\sqsubset_{\mathcal{F}} \rangle$
true

---

Figure 5:
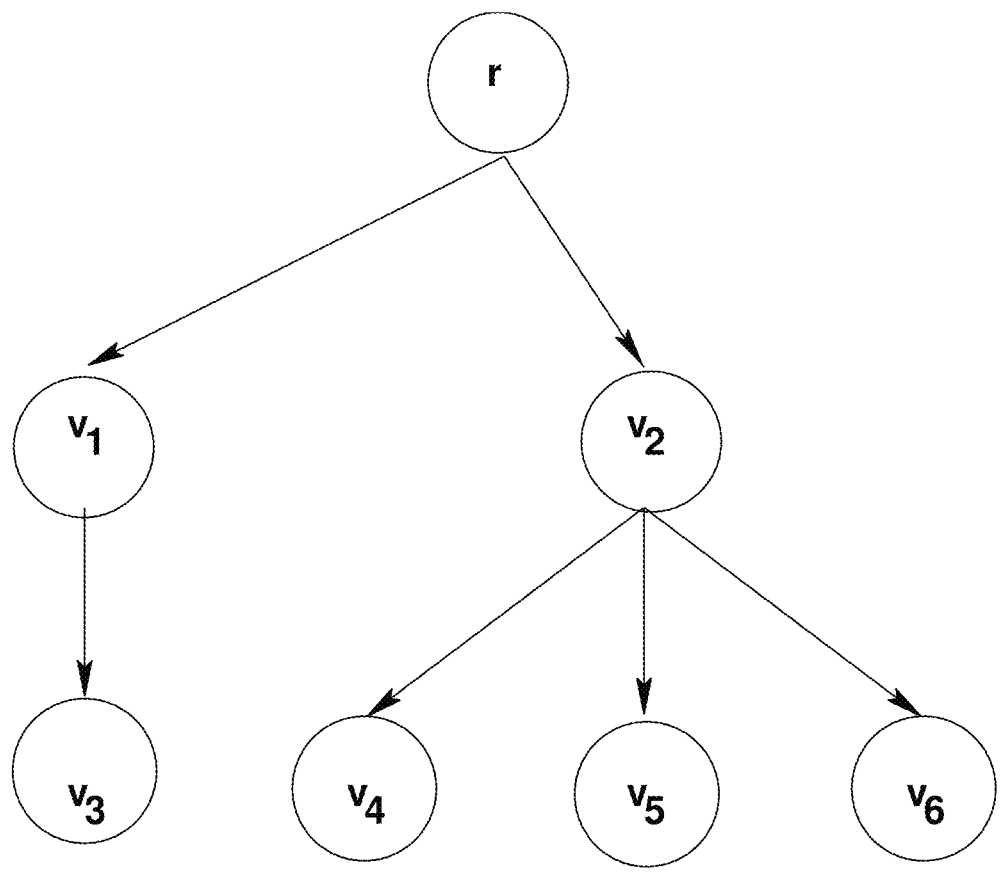
FIG. 5 is a diagram of another example of a rooted connected directed acyclic graph model of a network.

Lemma 1 states that if a leaf node exists such that it is not attached to the root and has a family of policies equal to $1_{\mathcal{F}}$, and the implementation scheme is GCD, then the family of policies executed at its parent and ancestors will be $1_{\mathcal{F}}$. For example, in the example of FIG. 5, if $p(v6)=1_{\mathcal{F}}$, then the policies at nodes v2 and r under the GCD scheme will also be $1_F$; that is $p(v2)=1_{\mathcal{F}}$ and $p(r)=1_{\mathcal{F}}$. This case does not meet the requirements of the SDD strategy which states that each child node should strictly refine its parent.

Having a leaf node with a family of policies equal to $1_{\mathcal{F}}$ deep in the network will result in no security control in the chain of firewalls from the root to that node. Thereby allowing unauthorized users access deep into the network without any line of defense. Consequently, this will hinder the overall security of the network. To prevent this case, the system needs to isolate the nodes having $1_{\mathcal{F}}$ policy and move them closer to the outer edge in the DMZ zone. A resource with policy $1_{\mathcal{F}}$ is intended to be accessed by everyone. Therefore, by segregating and moving the nodes with $1_{\mathcal{F}}$ policy close to the root, the resources with stricter policies can be protected efficiently.

Lemma 2. Let T be a spanning tree of height greater than 2. If T has two leaves $I_1$, $I_2$ belonging to the same subtree having coprime families of policies, then it is impossible to have an SDD implementation using the GCD scheme. Formally:

---

$(\exists l_1, l_2, s, n, m \mid s \in S \wedge n \geq 1 \wedge m \geq 1 \wedge (s, l_1) \in E^n$
$\wedge (s, l_2) \in E^m \cdot \gcd(l_1, l_2) = 1_{\mathcal{F}})^{\dagger}$
$\Rightarrow$
$\neg(p(r) \neq 0_{\mathcal{F}} \wedge (\forall a, b \mid (a, b) \in E \cdot p(b) \sqsubset_{\mathcal{F}} p(a)))$
Proof of Lemma 2.
$\neg(p(r) \neq 0_{\mathcal{F}} \wedge (\forall a, b \mid (a, b) \in E \cdot p(b) \sqsubset_{\mathcal{F}} p(a)))$
$\Leftrightarrow \langle$ De Morgan Law $\rangle$
$(p(r) = 0_{\mathcal{F}}) \vee (\exists a, b \mid (a, b) \in E \cdot p(b) \not\sqsubset_{\mathcal{F}} p(a))$
$\Rightarrow \langle$ Strengthening $\rangle$
$(\exists a, b | (a, b) \in E \cdot p(b) \not\sqsubset_{\mathcal{F}} p(a))$
$\Leftarrow \langle (r, s) \in E \rangle$
$p(s) \not\sqsubset_{\mathcal{F}} p(r)$
$\Leftrightarrow \langle p(s) = \gcd(p(s), \gcd(p(l_1), p(l_2)))$ and
$p(r) = \gcd(p(r), p(s))$ and from the hypothesis $\gcd(l_1, l_2) = 1_{\mathcal{F}} \rangle$
$1_{\mathcal{F}} \not\sqsubset_{\mathcal{F}} 1_{\mathcal{F}}$
$\Leftarrow \langle$ From the definition of $\sqsubset_{\mathcal{F}} \rangle$
true

---

Note that $^{\dagger}(a,b) \in E^k$ $^{\dagger}(a,b) \in E^k$ indicates a path with k edges from a to b.

Lemma 2 states that if a subtree of T has two nodes, such that their families of policies have nothing in common, then the family of policies of their common ancestors, including the root of the subtree and the root of the tree, under the GCD scheme is equal to $1_{\mathcal{F}}$. In this case, the SDD strategy is not satisfied. For example, in FIG. 5, if p(v4) and p(v6) are coprime families of policies such that GCD(p(v4), p(v6))=$1_{\mathcal{F}}$ then under the GCD scheme p(v2)=$1_{\mathcal{F}}$ and p(r)=$1_{\mathcal{F}}$.

Having nodes with coprime families of policies under a subtree will result in no security control in the chain of firewalls from their common ancestor to the root. This in turn affects the overall security of the network. Therefore, a well-designed network adhering to the SDD, groups resources that share common policies (e.g., resources belonging to same department) in a common segment, and places resources having nothing in common into different segments/subnetworks. This approach allows for maximum security and protection than grouping nodes in a random manner.

Lemma 3. If we have a family of policies at a node that is equal to the GCD of the family of policies of its siblings, then it is impossible to have an SDD implementation using GCD scheme. Formally:

$(\exists v \mid (u, v) \in E \cdot p(v) = (\gcd v_i \mid (u, v_i) \in E \cdot p(v_i)))$
$\Rightarrow$
$\neg(p(r) \neq 0_{\mathcal{F}} \wedge (\forall a, b \mid (a, b) \in E \cdot p(b) \sqsubseteq_{\mathcal{F}} p(a)))$
Proof of Lemma 3.
$\neg(p(r) \neq 0_{\mathcal{F}} \wedge (\forall a, b \mid (a, b) \in E \cdot p(b) \sqsubseteq_{\mathcal{F}} p(a)))$
$\Leftrightarrow$ ⟨ De Morgan Law ⟩
$p(r) = 0_{\mathcal{F}} \vee (\exists a, b \mid (a, b) \in E \cdot p(b) \not\sqsubseteq_{\mathcal{F}} p(a))$
$\Rightarrow$ ⟨ Strengthening ⟩
$(\exists a, b \mid (a, b) \in E \cdot p(b) \not\sqsubseteq_{\mathcal{F}} p(a))$
$\Leftarrow$ ⟨ (u, v) ∈ E ⟩
$p(v) \not\sqsubseteq_{\mathcal{F}} p(u)$
$\Leftrightarrow$ ⟨ From hypothesis $p(u) = (\gcd v_i (v, v_i) \in E \cdot p(v_i)) = p(v)$ ⟩
$p(v) \not\sqsubseteq_{\mathcal{F}} p(v)$
$\Leftarrow$ ⟨ From the definition of $\sqsubseteq_{\mathcal{F}}$ ⟩
true Lemma 3 states that if there is a node such that its family of policies is equal to the commonality of its siblings, then the family of policies of its parent is the same as the node under the GCD scheme. Clearly, in this case the SDD strategy is not satisfied. For example, in FIG. 5, if p(v4)=GCD(p(v5), p(v6)), then the family of policies of their parent v2; that is, p(v2)=p(4) using the GCD scheme.

Lemma 4. If there is a family of policies at a node that is equal to the union of its sibling family of policies, then it is impossible to have an SDD implementation using ⊕ scheme. Formally:

$(\exists v \mid (u, v) \in E \cdot (\forall v_i \mid (u, v_i) \in E \cdot p(v)))$
$\Rightarrow$
$\neg(p(r) \neq 0_{\mathcal{F}} \wedge (\forall a, b \mid (a, b) \in E \cdot p(b) \sqsubseteq_{\mathcal{F}} p(a)))$
Proof.
$\neg(p(r) \neq 0_{\mathcal{F}} \wedge (\forall a, b \mid (a, b) \in E \cdot p(b) \sqsubseteq_{\mathcal{F}} p(a)))$
$\Leftrightarrow$ ⟨ De Morgan Law⟩
$p(r) = 0_{\mathcal{F}} \vee (\exists a, b \mid (a, b) \in E \cdot p(b) \not\sqsubseteq_{\mathcal{F}} p(a))$
$\Rightarrow$ ⟨ Strengthening⟩
$(\exists a, b \mid (a, b) \in E \cdot p(b) \not\sqsubseteq_{\mathcal{F}} p(a))$
$\Leftarrow$ ⟨ (u, v) ∈ E ⟩
$p(v) \not\sqsubseteq_{\mathcal{F}} p(u)$
$\Leftrightarrow$ ⟨ $p(u) = (\oplus v_i \mid (v, v_i) \in E \cdot p(v_i)) = p(v)$ ⟩
$p(v) \not\sqsubseteq_{\mathcal{F}} p(v)$
$\Leftrightarrow$ ⟨ From the definition of $\sqsubseteq_{\mathcal{F}}$ ⟩
true Lemma 4 states that if there is a node such that the families of policies of its siblings are equal to or are subfamilies of its family of policies, then the family of policies of its parent is the same as the node under the ⊕ operator scheme. Clearly, the requirements for SDD strategy are not satisfied. For example, in FIG. 5, if $p(v_5) \preceq_{\mathcal{F}} p(v_4)$ and $p(v_6) \preceq_{\mathcal{F}} p(v_4)$ then p(v2)=p(v4), under the ⊕ operator scheme.

In view of the above, in an embodiment, the system 100 performs network segmentation that implements SDD. A weight function can be used to quantify the different security requirements and situations of an access control policy. This function can be used to formally define network segmentation. An atomic rule is modelled as a guarded command, which is a transition relation from the starting state to one or more end states. A weight can be assigned to an atomic rule in any suitable way based on security requirements or security situation of each of the resources of the network or in response to an ongoing security situation for each of the resources of the network. In a particular case, the weight of an atomic rule can be determined based on the weights of the end state(s). In some cases, weights can be assigned to the different values of chosen state attributes and using them to compute the weight of an end state, such that the values having higher security requirements are assigned higher weights. Furthermore, in some cases, since a chain is as secure as its weakest link, an atomic rule with a relation that maps a starting state to multiple end states has a weight equal to the minimum weight of its end states.

Formally, let $SA_i$, where $1 \leq i \leq m$, be the different state attributes, and let $V_{SA_i} = \{a_{i1}, a_{i2}, \ldots, a_{in}\}$ be the set of all possible values assigned to $SA_i$. Then $$w_{V_{SA_i}} : V_{SA_i} \to Z$$

is the weight function that assigns an integer value to each element in $VSA_i$, such that for any two elements $a_{ik}, a_{il} \in V_{SA_i}$ if the security requirement of $a_{ik}$ is less than that of $a_{il}$, then $$w_{V_{SA_i}}(a_{ik}) < w_{V_{SA_i}}(a_{il}).$$

Let R be the set of all atomic rules for all the resources in the organization. Then $w_R: R \to \mathbb{N} \cup \{-1\}$, is the weight function which assigns to an atomic rule $r \in R$ its corresponding weight. The weight of $1_{\mathcal{F}}$ is taken to be −1, as it is a rule that does not bring any security constraints. Furthermore, the weight of a rule (r) with its domain mapped to multiple end states (say p), is the minimum of the weights assigned to its end states. For each end state $s_i$, where $1 \leq i \leq p$, we take $$v_{s_i} = eval(w_{V_{SA_1}}, w_{V_{SA_2}}, \ldots, w_{V_{SA_p}}),$$

where $$w_{V_{SA_i}}$$

is the weight of the assigned value to the state attribute $SA_i$. For a state $s_i$, the eval function takes the weight of the attributes of $s_i$ and assigns to it and overall security weight $v_{s_i}$. Then to compute the weight of such an atomic rule, take the minimum of all the values $v_{s_i}$. Therefore, for an atomic rule r that has p end states, we have $w_R(r) = \min(v_{s_1}, \ldots, v_{s_p})$.

For an illustrative example, the weights of the atomic rules can be determined based on the ACTION (AC) state attribute, where AC={ACCEPT, REJECT, DROP}. The three actions in AC contribute differently to the confidentiality of the resources of the network. Therefore, in this regard, DROP has higher weight than REJECT, which in turn has a higher weight than ACCEPT. Based on this we can now assign the following weights to each element in AC: $\omega_{AC}$(ACCEPT)=0, $\omega_{AC}$(REJECT)=1, and $\omega_{AC}$(DROP)=2. Then, for example, a rule that maps an initial state to two states ($s_1$ and $s_2$), where the action state attribute in $s_1$ is assigned the value ACCEPT, and the action state attribute in $s_2$ is assigned the value REJECT, has a weight equal to the minimum of the two; that is, 0.

The weight of a policy, or a combined rule r, is the sum of the weights of its atomic rules. Let P be the set of all policies composed of the atomic rules in R. Then $w_P: P \to \mathbb{N} \cup \{-1\}$ is the weight function that assigns an integer value to each element in P based on $w_R$. The system 100 assigns −1 as the weight for the $1_{\mathcal{F}}$ policy, and +∞ as the weight of the $0_{\mathcal{F}}$ policy.

In a typical firewall policy, rules are executed sequentially. Such rules usually are not atomic. For example, a rule might be followed by another that includes it. If the weight function is applied on these rules, there can be double counting of weights. Therefore, to avoid any problem, the system 100 can transform policies into a set of rules/features that are (relative) atomic (or, relative prime) and can be modelled as a guarded command. A relative atomic/prime rule in this context is a rule that is indivisible by any other given rule (i.e., it is only divisible by 0 and itself). A policy is a set of rules, or a single rule, obtained by combining various rules. The weight function takes such a rule and assigns a weight to it.

In an illustrative example, consider the following Example Policy 3 on engineering workstations:

Example Policy 3

---
1 - A INPUT -m state --state RELATED, ESTABLISHED -j ACCEPT
2 - A INPUT -m state --state INVALID -j DROP
3 - A INPUT -s 192.168.1.0/24 -j REJECT
4 - A INPUT -s 192.168.2.0/24 -j ACCEPT
5 - A INPUT -s 192.168.3.0/24 -j REJECT
6 - A INPUT -s 192.168.4.0/24 -j REJECT
7 - A INPUT -j DROP
---

The above policy is transformed to a relative atomic policy with 270 rules: two rules with ACCEPT actions, three rules with REJECT actions, and 265 rules with DROP actions. Therefore, the weight assigned to the policy is $2*0+3*1+265*2=533$.

As can be seen, the system 100 measures the level of security requirements of a resource by the weight of the policy governing it, such that its security requirements are directly proportional to the weight of its policies. For example, consider two resources, $v_1$ and $v_2$, where the weights of their policies are $w(v_1)$ and $w(v_2)$, respectively. If $w(v_2)<w(v_1)$, it means that $v_1$ has higher level of security requirement than $v_2$.

Let $w_R$ be the partial order on the atomic rules based on their weights and $w_P$ be the total order on the policies based on the weights assigned to them. Then there exists an order preserving map $f: w_R \to w_P$ satisfying the following condition:

$$(\forall_i | 1 \leq i \leq n \wedge x_i, y_i \text{ are atomic rules}: x_i < w_R y_i) \Leftrightarrow f(P(x_1, x_2, \ldots, x_n)) < w_P f(P(y_1, y_2, \ldots, y_n)),$$

where $P(x_1, x_2, \ldots, x_n)$, $P(y_1, y_2, \ldots, y_n)$ are the policies consisting of atomic rules $x_1, x_2, \ldots, x_n$ and $y_1, y_2, \ldots, y_n$ respectively. Since $w_R$ is a partial order, some values of the atomic rules might not have a weight assigned. In this case, the mapping f assigns zero, the neutral value for addition.

Segmentation can be defined formally based on the weights of the commonalities among the policies of the resources in a segment. Let R be a set of resources. A set S ⊆ R is said to be a segment of R iff:

$$(\forall r, r' | r \in S \wedge r' \in (R-S) \cdot w_P(gcd(p(r), p(r'))) \leq w_P(gcd(r | r \in S \cdot p(r))))$$

Let R be a set of resources, and let F be a set of subsets of R such that $(\cup A | A \in F \cdot A) = R$. Then F is a segment of R iff $(\forall A | A \in F \cdot A$ is a segment of R).

In this definition of segmentation, a resource is placed within a group of resources if and only if the commonalities it has with the members of the group is stricter; that is, the commonalities have equal or more weight than the weight of the commonalities it shares with any other resource not in the segment. As a result, this segmentation provides maximum access-control protection to its resources.

Lemma 5a: Let S⊆R be a set of resources formed by only mutually co-prime policies that are not equal to $1_{\mathcal{F}}$. S forms a segment only if $(\forall r | r \in (R-S) \cdot p(r) = 1_{\mathcal{F}})$. Lemma 5b: Let S⊆R, and there exists resources r, r'∈S such that $p(r) = 1_{\mathcal{F}}$ and $p(r') \sqsubset 1_{\mathcal{F}}$ and:

$$(\forall r, r' | r \in S \wedge r' \in (R-S) \cdot gcd(p(r), p(r')) = 1_{\mathcal{F}})$$

Then S is a segment.

Proof of Lemma 5a:

---
S is a segment ⇔ ⟨ Definition 3 ⟩
$(\forall r, r' | r \in S \wedge r' \in (R - S) \cdot w_P(gcd(p(r), p(r'))))$
  $\leq w_P(gcd(r | r \in S \cdot p(r))))$
⇔ ⟨ S is a set consisting of resources having
  co-prime policies, gcd of co-prime policies = $1_{\mathcal{F}}$ ⟩
$(\forall r, r' | r \in S \wedge r' \in (R - S) \cdot w_P(gcd(p(r), p(r'))) \leq w_P(1_{\mathcal{F}}))$
⇐ ⟨ From hypothesis $p(r') = 1_{\mathcal{F}}$ ⟩
$(\forall r, r' | r \in S \wedge r' \in (R - S) \cdot w_P(gcd(p(r), 1_{\mathcal{F}})) \leq w_P(1_{\mathcal{F}}))$
⇔ ⟨ Because $(\forall a | \cdot gcd(a, 1_{\mathcal{F}}) = 1_{\mathcal{F}})$ ⟩
$(\forall r, r' | r \in S \wedge r' \in (R - S) \cdot w_P(1_{\mathcal{F}}) \leq w_P(1_{\mathcal{F}}))$
⇐ ⟨ reflexivity of ≤ ⟩
true
---

Proof of Lemma 5b:

---
S is a segment ⇔
⟨ Definition 3 ⟩
$(\forall r, r' | r \in S \wedge r' \in (R - S) \cdot$
$w_P(gcd(p(r), p(r'))) \leq w_P(gcd(r | r \in S \cdot p(r)))) \Leftarrow$
⟨ From hypothesis: $(\forall r, r' | r \in S \wedge r' \in$
  $(R - S) \cdot gcd(p(r), p(r')) = 1_{\mathcal{F}})$ ⟩
$(\forall r, r' | r \in S \wedge r' \in (R - S) \cdot w_P(1_{\mathcal{F}}) \leq w_P(gcd(r | r \in S$ $\cdot p(r)))) \Leftarrow \langle r \in S$ and $p(r) = 1_{\mathcal{F}}$, which makes
  $gcd(r | r \in S \cdot p(r)) = 1_{\mathcal{F}} \rangle$
$(\forall r, r' | r \in S \wedge r' \in (R - S) \cdot w_P(1_{\mathcal{F}}) \leq w_P(1_{\mathcal{F}})) \Leftarrow$
⟨ reflexivity of ≤⟩
True
---

By requiring DD, resources with $1_{\mathcal{F}}$ policy are directly attached to the root having policy $1_{\mathcal{F}}$, thus forming a DMZ. If a segment satisfying the condition in Lemma 5a exists, then the root of this segment will have $1_{\mathcal{F}}$ policy. Consequently, the root of the global network will have $1_{\mathcal{F}}$ policy. To achieve SDD all the resources and internal nodes attached to the root of the segment S will be attached to the global root. By Lemma 5b, S is not a segment, if S⊄R, or there do not exist resources r, r'∈S, such that $p(r)=1_{\mathcal{F}}$ and $p(r') \sqsubset 1_{\mathcal{F}}$, or there exists resources r∈S and r'∈(R−S) such that $GCD(p(r), p(r')) \neq 1_{\mathcal{F}}$. This means that if S is a segment that has some resources with $1_{\mathcal{F}}$ policy and other resources with policies different than $1_{\mathcal{F}}$, then the commonality of each resource in S with a resource out of S has to be $1_{\mathcal{F}}$. Otherwise, S cannot be a segment.

Superfluous Firewall Chaining exists in a network when a firewall has only a single firewall attached to it. For example, when firewalls are connected to each other forming a chain, and resources are attached only at the bottom of the chain, thus in this case, firewalls only exist to protect other firewalls. Therefore, superfluous firewall chaining is a waste of network resources, as it is possible to replace all the firewalls forming a chain with the firewall at the bottom of the chain with resources attached, as it has the most restrictive policies among all the other firewalls in the chain.

A robust network can be defined that provides maximum access-control protection to its resources using minimum firewalls. It achieves this by implementing the SDD strategy and segmentation described herein.

A network topology, in an example represented as a graph G, is said to be access control robust if the following criteria holds:

1) G satisfies SDD strategy in every path from the root to the parent of a resource,
2) G has a segmentation, and
3) G has no superfluous firewall chaining.

The first criteria for a robust network ensures that any two internal nodes strictly refine each other. However, it allows a leaf node and its parent to have the same policy. This can be seen when resources have $1_\mathcal{F}$ policy, and as a result the firewall protecting them that is, the root will also have $1_\mathcal{F}$ policy. The second criteria ensures that resources are segmented in a way that maximum access protection is provided to them. These segments are then placed in the network at varying depths depending on their levels of security requirements. Segments with high levels of security requirements are placed deep down in the network and protected by layers of firewalls each adding an extra level of security. And the segments with low levels of security are placed closer to the root; that is, the outer firewall. Therefore, traffic going from the internet to an internal segment is faced by layers of firewalls and traffic from segment to segment is managed by internal firewalls. Consequently, segments consisting of resources with high levels of security requirements are protected from internal and external threats. Furthermore, if an unauthorized user gains access to an internal segment, he/she will not be able to easily gain access to another segment. The third criteria ensures that the most effective strict defense in depth and segmentation is achieved at minimum cost.

In an example of network segmentation, let R be the set of resources with their policies. Then the system 100, using R, builds a robust network by computing the Greatest Common Divisor (GCD) of resource policies and using the refinement relation on these GCDs. For simplicity, the approach can be discussed using policies rather than families of policies. However, this approach can be applied to family of policies that are enforced at each node in the network topology.

The GCD operator uses the notion of a divisibility relation among product families (a|b)⇔(∃c|·b=a·c), which allows the system to find divisors of families. Therefore, the system can find the GCD, which is the common divisor that is divided by all other common divisors. Hence, the following property holds: gcd (a, b)=d, such that the following condition is satisfied: [(d|a)∧(d|b)∧((∀c|·(c|a)∧(c|b))⇒ (c|d))]. Finding the commonalities of two families is formalized by finding the GCD. For two families, a and b, they are considered coprime family if gcd (a, b)=1. For any family a, gcd (1, a)=1, and gcd (a, 0)=a, as a ·0=a and therefore a|0.

Note that a resource having $0_\mathcal{F}$ policy; that is, a nonexecutable policy is essentially inaccessible, it cannot be protected through an access control system, as the $0_\mathcal{F}$ policy cannot be enforced at an access control point, and therefore it cannot be part of a robust network architecture. Therefore, it can be assumed that the input R does not contain resources with $0_\mathcal{F}$ policies. Furthermore, by Lemma 1, having any internal node/leaf with $1_\mathcal{F}$ policy implies that SDD is not achievable in the network topology. By Lemma 5a, resources with $1_\mathcal{F}$ policy have to be attached to the root with $1_\mathcal{F}$ policy. Therefore, the system 100 removes resources with $1_\mathcal{F}$ policy a-priori from the set R, and later adds these resources to the root.

Figure 3:
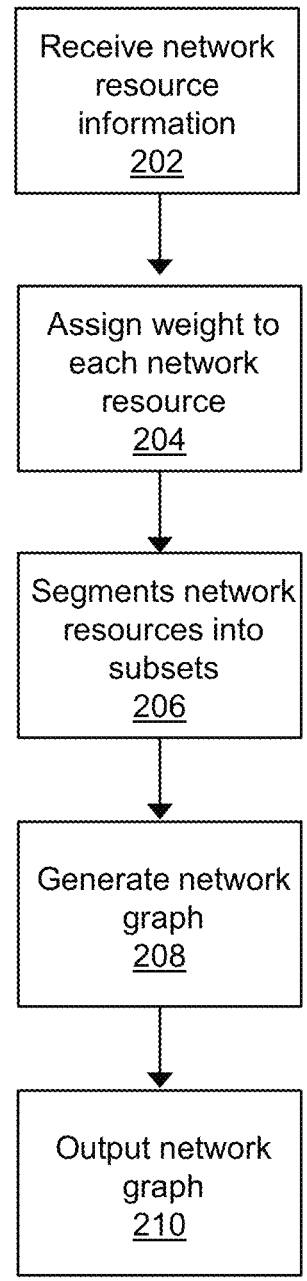
FIG. 3 is a flowchart of a method for determining an arrangement of network resources to provide robust network access security, in accordance with an embodiment.

FIG. 3 illustrates a flowchart diagram of a method for determining an arrangement of network resources to provide robust network access security 200, in accordance with an embodiment. Informally, the method 200 can be referred to as implementing a robust network and segmentation (RNS) approach. The network having one or more access points to externally access the network, and each network resource having an associated security policy.

At block 202, the input module 118 receives information of the network resources and the one or more access points, for example, from the input interface 106, the database 116, or the network interface 114.

At block 204, the weighting module 120 assigns a weight to each network resource based on the associated security policy, where a greater weighting corresponds to a requirement for a greater level of security.

At block 206, the segmentation module 122 segments the network resources into subsets, where a network resource is associated with a given subset if the greatest common divisor (GCD) of the network resource with other network resources in the subset has equal or more combined weight than the combined weight of the GCD of the network resource with other network resources not in the subset.

At block 208, the graph module 124 generates a network topology by adding subsets to nodes in the network topology in descending order by weight until one of the one or more access points is reached, where security policies at a given node are a refinement of the security policies at an ancestor node of the given and where vertices between nodes are firewalled.

At block 210, the output module 126 outputs the network topology to, for example, the output interface 108, the database 116, or the network interface 114.

In a particular case, the RNS approach can consist of five main tasks. The first task is calculating the GCDs or common policies. The second task is building a network graph based on the refinement relation consisting of only firewalls. The third task is adding resources to the network graph, and the fourth task is pruning the network graph to get a. robust network topology. Finally, the fifth task is to add all the resources with $1_\mathcal{F}$ policy (if they exist), to the network. An example of the approach is illustrated in Algorithm 1 below:

---

Algorithm 1 Exponential Robust Network and Segmentation Algorithm

---

```
1: procedure EXP-SEGMENTATION(R)
2:   S ← set of resources having 1_F policy
3:   R ← R − S
4:   GCD ← COMPUTE-GCD(R)
5:   G ← BUILD-NETWORK-GRAPH(GCD, R)
6:   ADD-RESOURCES-TO-NET(G, GCD, R)
7:   OPTIMIZE-NETWORK-GRAPH(G)
8:   if S ≠ ∅ then
9:     ADD-1F-RESOURCES(G, S)
10:  end if
11: end procedure
```

---

The system 100 can compute the commonalities or the GCD of policies of resources. To segment resources, they can be placed within a segment such that maximum security (access-control protection) is achieved. To achieve this, a brute force approach can be used to compute all possible segments by computing the powerset of R, $\mathcal{P}$ (R), (where each set in $\mathcal{P}$ (R) represent a possible segment). Then, the commonalities in each segment can be computed by computing the GCD of the resource policies in that segment. In an example, the procedure to compute GCD can include:

```
procedure COMPUTE-GCD(R)
    𝒫(R) ← power set of R minus all singleton sets and
    empty set.
    GCD ← ∅                    ▷ initialize GCD set.
    for each s ∈ 𝒫(R) do
        Create gcd_s object
        gcd_s.p ← Calculate the GCD of the policies of
        resources in s
        flag = false
        for each gcd ∈ GCD do
            if gcd.p = gcd_s.p then
                flag = true
                if gcd.size < |s| then
                    gcd.size ← |s|
                    gcd.set ← s
                end if
            elseif gcd.p ⊑ gcd_s.p ∧ gcd.weight =
            gcd_s.weight then
                GCD = GCD − {gcd}
            elseif gcd_s.p ⊑ gcd.p ∧ gcd.weight =
            gcd_s.weight then
                flag = true
            end if
        end for
        if flag = false then
            gcd_s.set ← s
            gcd_s.size ← |s|
            gcd_s.weight ← weight of gcd_s.p
            GCD ← GCD ∪ {gcd_s}
        end if
    end for
    return GCD
end procedure
```

The COMPUTE-GCD procedure can first compute the power set of the set of resources R, $\mathcal{P}$ (R). It then computes the GCD for each set in $\mathcal{P}$ (R). While computing the GCDs, the procedure maintains a set GCD, consisting of objects called the GCD objects. Each GCD object has the following attributes: p, set, weight, and size. Attribute set represents the set of resources, which is a set in $\mathcal{P}$ (R) Attribute p represents the GCD of the policies of the resources in set. Attribute weight is the weight of the policy p, and attribute size represents the cardinality of set. To minimize the number of GCD objects stored in GCD, each object in GCD has a unique policy p. To achieve this, if the GCD of two sets in $\mathcal{P}$ (R) is the same, then we store the GCD object corresponding to the larger set. Further, for any two sets s1, s2∈$\mathcal{P}$ (R), if the GCD of policies of s1 refines the GCD of policies of s2, and if both these policies have the same weight, then the system only stores the GCD object corresponding to s2. Table I gives all the GCD objects in the GCD set, and the set of resources in set for the illustrative example after procedure COMPUTE-GCD is executed.

TABLE I

| gcd objects in GCD set | Set of Resources |
|---|---|
| gcd 1 | {Web_server, Email_server, File_server, Fin.DB, Fin.1, Fin.2, Eng.1, Eng.2} |
| gcd 2 | {File_server, Fin.DB, Fin.1, Fin.2, Eng.1, Eng.2} |
| gcd 3 | {Eng.1, Eng.2, Fin.DB, Fin.1, Fin.2} |
| gcd 4 | {Eng.1, Eng.2} |
| gcd 5 | {Fin.DB, Fin.1, Fin.2} |

To build a network topology, the root R is the GCD object having the least weight and its set consists of all resources (except the resources with $11_\mathcal{F}$ policy). It is first added to the network graph G. After which nodes in F having the same weight as the root r are removed. Then, the system computes wmax weight, the maximum weight over the weights of all nodes in F, and computes the set T consisting of all nodes with wmax weight and removes them from F. Then each node in the set T is added to G using an ADD-NODESET-TO-G procedure. The last two steps are repeated till F=∅; that is, the last two steps are repeatedly executed to (possibly) add all the nodes in F to G.

```
procedure BUILD-NETWORK-GRAPH(F, R)
    G ← ∅                          ▷ G = (E; V; r)
    r ← gcd object that has all resources R in its set
    attribute
    r.π ← ∅; r.resource ← false
    V ← V ∪ {r}
    F ← F − minus gcd objects with the same weight as
    the root r
    while F ≠ ∅ do
        w_max ← maximum weight of any s ∈ F.
        T ← ∅
        for each s ∈ F do
            if s.weight = w_max then
                T ← T ∪ s; F ← F − s
            end if
        end for
        ADD - NODESET-TO-G(G, F, T, w_max)
    end while
    return G
end procedure
```

For adding GCD nodes in T to the network graph, the GCD nodes are added to the network graph based on the weight attribute of the GCD object. Nodes are added to G in batches (set T) starting with maximum weight to minimum weight. The ADD-NODESET-TO-G procedure adds the set of nodes in T in non-increasing order by their size attribute; that is, nodes in T having the largest size is processed first, followed by a node with next (or same) largest size is processed to add it to G. During the execution of the procedure, the resT set is maintained such that it contains the set of resources for which GCD nodes have not been added. Initially, resT contains all resources contained in all the GCD nodes in T. Then the procedure iterates through each node s in T and if s.set still contains resources unaccounted for in G, it is evaluated. During this evaluation, every child c of the root r that refines s is added to cset. Then s is added to G by attaching it to r. If cset is not empty, then all nodes in it are attached to s as its children, and their connection to r is removed. Finally, the resources in s.set are removed from resT (if they exist).

```
procedure ADD-NODESET-TO-G(G, F, T, w_max)    ▷
    G = (V; E; r)
    resT ← ∅
    for each s ∈ T do
        resT ← resT ∪ s.set
    end for
    T ← T nodes ordered in non-increasing order by their
    size attribute.
    for each s ∈ T ∧ (s.set ∩ resT ≠ ∅) do
        cset ← ∅
        for each child c of r do
            if c.p ⊑ s.p then
                cset ← cset ∪ {c}
            end if
        end for
        V ← V ∪ {s}
        E ← E ∪ {(r, s)}
        s.π ← {r}
```

-continued

```
        if cset ≠ ∅ then
            for each c ∈ cset do
                E ← E - {(r, c)} ∪ {(s, c)}
                c.π ← c.π - {r} ∪ {s}
            end for
        end if
        resT ← resT - s.set
    end for
end procedure
```

Figure 6:
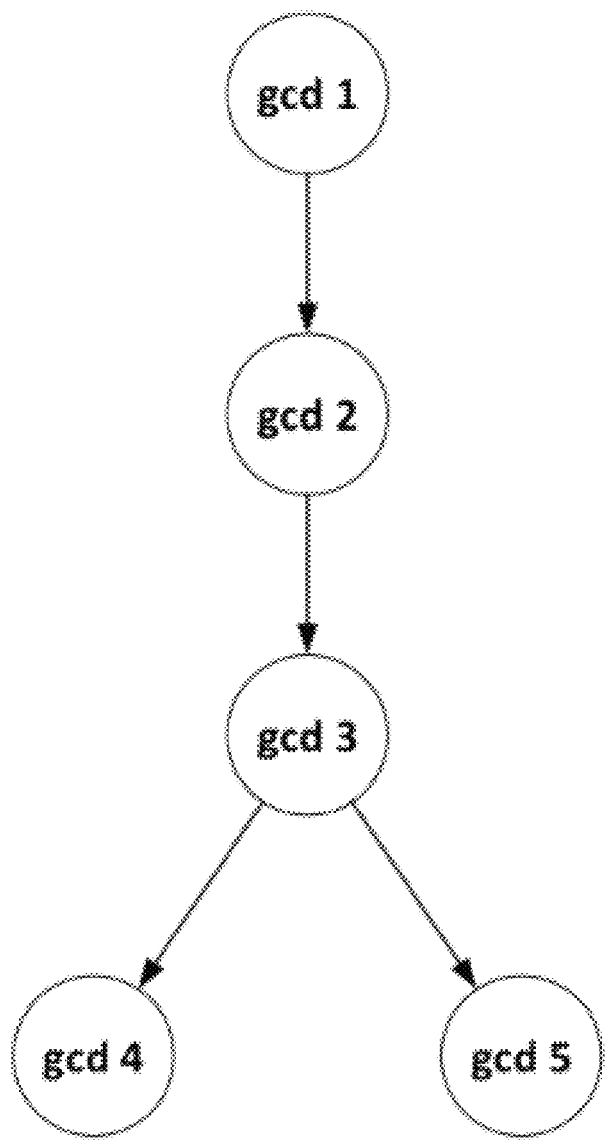
FIG. 6 is a diagram of another example of a rooted connected directed acyclic graph model of a network after application of the system of FIG. 2.

FIG. 6 shows a network graph for an illustrative example produced by the BUILD-NETWORK-GRAPH procedure. Observe that in the graph each path represents a refinement chain (e.g., gcd4 ⊑_F gcd3 ⊑_F gcd2 ⊑_F gcd1).

The procedure ADD-RESOURCES-TO-NET adds resource nodes to the network graph G. While adding the resource nodes, the system first orders the GCD objects in GCD in descending order by weight ($GCD_{max}$). Then it chooses the GCD node having the maximum weight and attach all the resources in its set attribute, and in R' (initially R'=R), to it. After which it removes the attached resources from the set of resources R'. This is done for each GCD node in $GCD_{max}$. All resources are added to the network graph G. Observe that by adding resources to GCD nodes starting with maximum weight to minimum weight, it ensures that resources with higher security requirements are protected with maximum layers of protection.

```
procedure ADD-RESOURCES-TO-NET(G, GCD, R)
    GCD_max ← ordered list of gcd ∈ GCD in descending
        order by weights.
    R' = R
    for each gcd ∈ GCD_max do
        for each s ∈ gcd.set do
            if s ∈ R' then
                s.is_resource ← true
                s.π ← s.π ∪ {gcd}
                V ← V ∪ {s}
                E ← E ∪ {(gcd, s)}
                R' = R' - {s}
            end if
        end for
    end for
end procedure
```

The GCD graph can be optimized. The network graph obtained after executing the procedure Add-Resources-To-Net could suffer from superfluous firewall chaining. To eliminate this issue, the system can use the OPTIMIZE-NETWORK-GRAPH procedure. This procedure performs a post-order traversal of G using two stacks (S, T), so that all children of a node are evaluated before it. Since the graph G is not necessarily binary, the system does not always evaluate the children of a node from left to right (any order is acceptable), where all children of a node are evaluated before it. S is used to keep track and evaluate all children of a node before itself, and T is used to store the post-order traversal of G. When S is empty (and T is full), nodes are popped from T one at a time and are evaluated. When a node u is being evaluated, if u is a GCD node and it has no children, or if u has only one child that is a GCD node, then u and its corresponding edges are deleted from G. If u has only one child that is a GCD node, then the child is attached to u's parent.

```
procedure OPTIMIZE-NETWORK-GRAPH(G)
                                    ▷ G = (V; E; r)
    S ← ∅; T ← ∅                    ▷ S, T are stacks
    Push(S, r)
    while S ≠ ∅ do
        u ← Pop(S)
        Push(T, u)
        for each c child of u do
            Push(S, c)
        end for
    end while
    while T ≠ ∅ do
        u ← Pop(T)
        child_count = 0
        f_flag = false
        for each c child of u do
            child_count = child_count + 1
            if c.is_resource = false then
                f_flag = true
            end if
        end for
        if child_count = 0 ∧ u.is_resource = false
            then
            V = V - {u}
            for each x ∈ u.π do
                E = E - {(x, u)}
            end for
        else if (child_count = 1 ∧ f_flag = true) then
            V = V - {u}
            c.π ← c.π - {u}
            c.π ← c.π ∪ {u.π}
            E = E - {(u, c)}
            for each x ∈ u.π do
                E = E - {(x, u)}
                E = E ∪ {(x, c)}
            end for
        end if
    end while
end procedure
```

Figure 7:
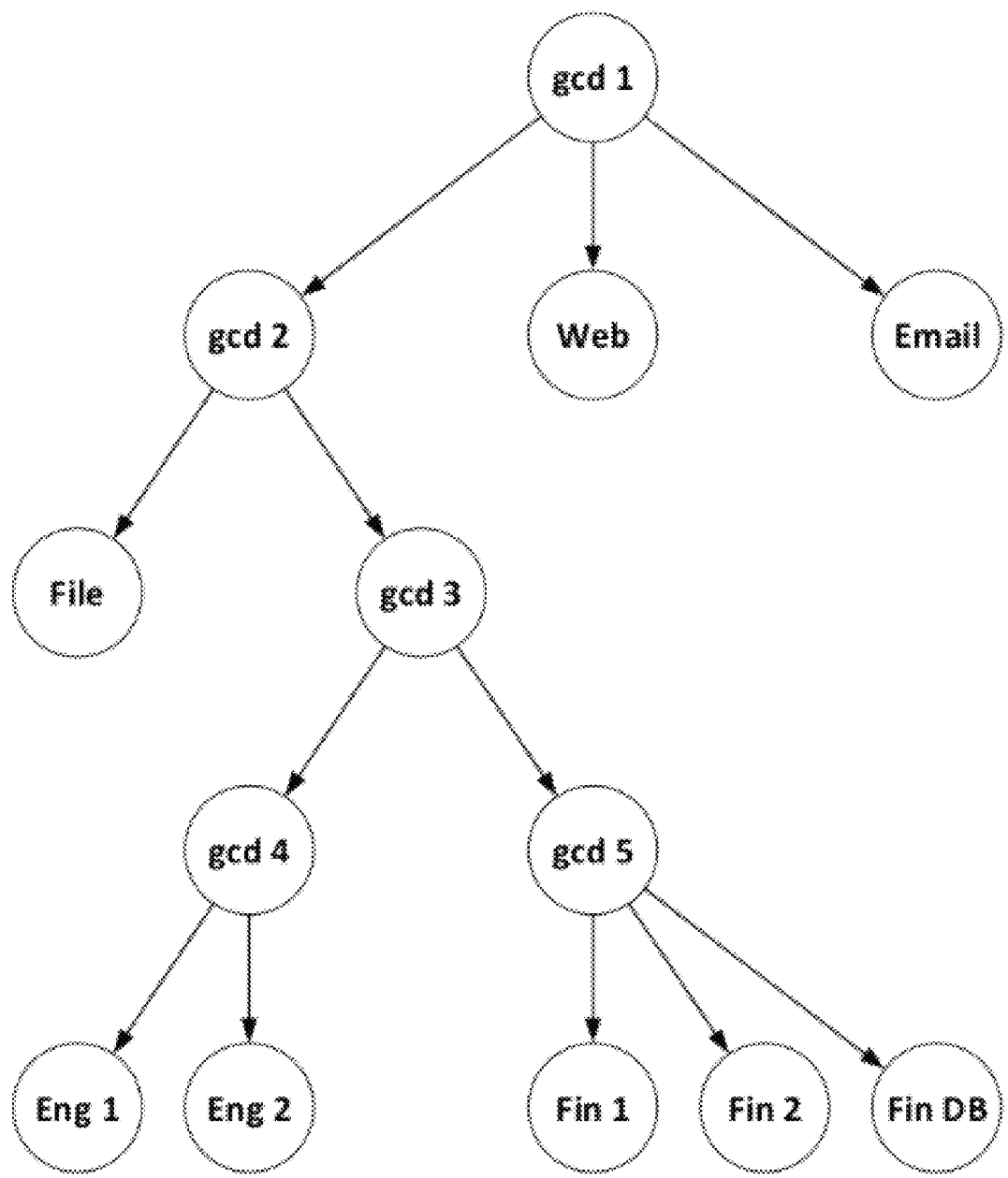
FIG. 7 is a diagram of the network topology of FIG. 6 after adding resources by the system of FIG. 2.

An example of a robust network topology with resources attached is shown in FIG. 7.

In some cases, resources can be added with policy $1_F$ to G. If S≠∅; that is, the set of resources contains resources with policy $1_F$, these resources can be added to the network topology using procedure ADD-DMZ1 outlined as follows:
1) If the policy of the root r·p=1} then all the resources in the set S are directly attached to r.
2) However, if the policy of the root r·p≠$1_F$, a new node r' is created, and set its attributes appropriately (as shown in Procedure Add-DMZ1), and add it to G. After which, r is attached and all the resources in the set S to it. The node r' is the new root for the network graph G, representing the network topology.

```
procedure ADD-DMZ1(G, S)
    if S = ∅ then return error
    end if
    if r.p = 1_F then
        r.set ← r.set ∪ S; r.size ← r.size + |S|
        for each s ∈ S do ▷ Attach resources in S to r
            s.is_resource ← true
            s.π ← {r}
            V ← V ∪ {s}
            E ← E ∪ {(r, s)}
        end for
    else
        Create node r'          ▷ Create new root r' of G
        r'.set ← r.set ∪ S; r'.size ← r.size + |S|
        r'.p ← 1_F; r'.weight ← -1
        r'.π ← ∅
        V ← V ∪ {r'}            ▷ Add new root r' to G
        r.π ← {r'}              ▷ Attach r to r'
        E ← E ∪ {(r', r)}
        for each s ∈ S do       ▷ Attach resources in S to r'
```

```
                s.is_resource ← true
                s.π ← {r'}
                V ← V ∪ {s}
                E ← E ∪ {(r', s)}
            end for
        end if
    end procedure
        procedure ADD-1F-RESOURCES(G, S)
            if S = ∅ then return error
            end if
            if r.p = 1_F then
                r.set ← r.set ∪ S; r.size ← r.size + |S|
                for each s ∈ S do
                    s.is_resource ← true
                    s.π ← {r}
                    V ← V ∪ {s}
                    E ← E ∪ {(r, s)}
                end for
            else
                Create node r'              ▷ Create new root r' of G
                r'.set ← r.set ∪ S; r'.size ← r.size + |S|
                r'.p ←1_F≠; r'.weight ← weight of 1_F policy
                r'.π ← ∅
                V ← V ∪ {r'}                ▷ Add new root r' to G
                r.π ← {r'}                  ▷ Attach r to r'
                E ← E ∪ {(r', r)}
                for each s ∈ S do
                    s.is_resource ← true
                    s.π ← {r'}
                    V ← V ∪ {s}
                    E ← E ∪ {(r', s)}
                end for
            end if
        end procedure
```

The present embodiments can be used to construct a robust network topology. As proof, it can be assumed that at least one of the three criteria required for a network graph to be robust is not satisfied. Suppose condition 1 is not satisfied, then there exists at least one path in G from the root to the parent of a resource, such that the SDD strategy is not satisfied. Recall that the GCD set computed by the COM-PUTE-GCD procedure has GCD objects with distinct policies. In Exp-RNS, GCD nodes are added to G only by the BUILD-NETWORK-GRAPH and ADD-1F-RESOURCES procedures. In the BUILD-NETWORK-GRAPH procedure, a GCD node is first added to G, and any child of r that refines s is disconnected from the root and attached as a child to s. In both these cases, the SDD strategy is satisfied. In the ADD-1F-RESOURCES procedure, the only GCD node added to G is the root r' having $1_F$ policy, and is added only if r.policy is not equal to $1_F$. Clearly, SDD strategy is satisfied as all policies not equal to $1_F$ strictly refine $1_F$. Therefore, every path from the root to a resources' parent satisfies the SDD strategy, which is a contradiction.

As further proof, suppose condition 2 is not satisfied. Then there exists a segment S, such that a resource r∈ S and a resource r'∉ S have commonalities with more weight than the weight of the commonalities between elements of the segment S. If this holds then there will be a GCD node in G with the policy GCD (r, r') and its corresponding weight. However, since we add resources to GCD nodes starting with GCD nodes having maximum weight to the GCD nodes having minimum weight, the resources r and r' would be added to the node having the policy GCD (r, r'); which is a contradiction.

As further proof, suppose condition 3 is not satisfied; that is, superfluous firewall chaining exists in G. Then there exists at least one firewall with a single node attached that is a firewall. Recall that in the procedure OPTIMIZE-NETWORK-GRAPH, the system counts the number of children attached to each firewall. If the node has only one child that is a firewall, it removes this node and attach its child to its parent(s). Therefore, by the end of the RNS Algorithm, the graph G has no superfluous firewalls; which is a contradiction.

In an embodiment, the system can use a polynomial algorithm to build a robust network topology represented as graph G, given a set of resources with its policies R. Similar to exponential algorithm described herein, for this algorithm, it is also assumed that R does not contain resources with $0_F$ policies. This algorithm takes advantage of the fact that nodes are added to G in non-increasing order of weights (except for the root). To achieve a polynomial running time, resources are used and their weights, and create temporary nodes to guide us through the network building process.

In the polynomial algorithm, the root is added first to G, and nodes are added in batches (set T) to G in decreasing order of their weights. Hence, at any given time, when a node s is evaluated to see which segment it can be part of, the weight of all the nodes in G is greater than or equal s·weight. While forming a segment containing s, clusters of resources are evaluated based on their weights. Note that, the weight of any segment containing s is always less or equal to s·weight, and so the maximum weight of any segment containing s is s·weight. Therefore, when such a cluster of nodes is identified, the system creates a GCD node to protect this segment and add it to the root of G and attach the nodes forming the segment to it. Otherwise, the system creates a temporary node for the cluster and add it to F, so that it can be evaluated later when the set having the weight of the cluster is being evaluated.

Algorithm 2
Robust Network and Segmentation (RNS) Algorithm

```
1:  procedure SEGMENTATION(R)     ▷ R = {r_1, r_2, ..., r_n}
2:      G ← NULL                  ▷ G = (V, E, r)
3:      r ← CREATE-NODE(R)        ▷ Create root r
4:      ADD-NODE-TO-G(G, r, ∅, false)  ▷ Add root r to G
5:      S^1, S^2, ..., S_m ⊂ R such that ⋃_{i=1}^{m} S_i = R, and no two
        subsets have resources with the same policies
6:      F = ∅
7:      for each s ∈ {S_1, S_2, ..., S_m} do
8:          F = F ∪ CREATE-NODE(s)
9:      end for
10:     while F ≠ ∅ do
11:         w_max ← maximum weight of any s ∈ F
12:         T ← ∅
13:         for each s ∈ F do
14:             if s.weight = w_max then
15:                 T ← T ∪ s; F ← F − s
16:             end if
17:         end for
18:         ADD-NODESET-TO-G(G, F, T, w_max)
19:     end while
20: end procedure
```

Note that, temporary nodes are generally never added to G. While evaluating a temporary node, if the cluster of nodes with s actually forms a segment at that point, a new GCD node is created and added to G. This is similar to adding any other GCD node. After which, the temporary node is deleted from F.

The polynomial algorithm can be as follows:
1) First create the root r for all resources in R using the CREATE-NODES procedure and add it to the graph G.

2) Then create subsets $S_1, S_2, \ldots, S_m \subset R$, such that no two subsets have resources with same polices, and creates a node for each subset $S_i$, $1 \leq i \leq m$, and add it to F. Therefore, F contains either a single resource node, or a GCD node consisting of resources in its set at this point. If distinct values are assigned from 1-m termed as key values, to each distinct rule in R, then the subsets $S_1, S_2, \ldots, S_m \subset R$ can be easily created using Bucket sort as follows: create m buckets labelled from 1-m, for each 3) distinct rule. As the system traverses through the rules in R, it simply evaluates its label and places it in the bucket having the same label.

4) After creating $S_1, S_2, \ldots, S_m$, the system computes the $w_{max}$ weight, the maximum weight over the weights of all nodes in F, and computes the set T, consisting of all nodes with Wmax weight and removes all these nodes from F.

5) The nodes in set T are added to G using the ADD-NODESET-TO-G procedure.

6) The above two steps are repeated till F=∅; that is, the above two steps are repeatedly executed to (possibly) add all the nodes in F to G.

```
procedure ADD-NODESET-TO-G(G, F, T, w_max)
    G = (V; E; r)
    if w_max = r.weight then ▷ Attach resources having
    same weight as r to r
        ATTACH-RESOURCES-TO-R(G, T)
    else
        for each s ∈ T do ▷ Add permanent nodes in T
    to G
            if s.temp = false then
                ADD-NODE-TO-G(G, s, 0, false)
            end if
        end for
        for each s ∈ T do      ▷ Check child nodes of r to
    add gcd node
            cset ← 0
            cset ← CURR-MAX-WEIGHT-SET(G, s)
            if cset ≠ 0 then
                gcd = CREATE-NODE (cset)
                if !s.temp then
                    if (s.weight = gcd.weight) then
                        ADD-NODE-TO-G(G, gcd, cset, true)
                    else ▷ Mark gcd as a temporary node
                        gcd.temp ← true; gcd.set ← s
                        gcd.size ← 1
                        F ← F ∪ {gcd}
                    end if
                else
                    if gcd.weight = s.weight then
                        ADD-NODE-TO-G(G, gcd, cset, true)
                    end if
                end if
            end if
```

The ADD-NODESET-TO-G procedure adds the set of nodes in T to G. The outline of this procedure is as follows:

1) If $w_{max}$=r·weight, the ADD-NODESET-TO-G procedure directly attaches to r all the resources in every non-temporary node s ∈ T and exits. Otherwise, it implements the below steps.

2) The procedure loops through each node s in T to (possibly) add it to G. If s is not a temporary node (indicated by the temp node attribute), it is added to G as a child of the root r.

3) Every child of r is evaluated to compute cset, the set consisting of nodes including s (or including the single element in s.set, if s is a temporary node). cset is computed by the CURR-MAX-WEIGHT-SET function.

4) A new GCD node GCD is computed for the set of resources in cset, if cset ≠∅. If s is a permanent node, then the system checks if GCD·weight=s·weight. If it is, GCD is added to G; otherwise GCD is tagged as "temporary", to be considered for evaluation later, and added to F. If s is a temporary node and if the node in s.set is still part of the segment formed by GCD, then GCD is added to G. Otherwise, it is automatically removed from F, as all the nodes in T are removed from F, before adding them to G.

```
function CURR-MAX-WEIGHT-SET(G, s)
    S ← ∅; snew ← ∅
    Sgcd ← ∅       ▷ gcd of policies of the nodes in S
    cmax ← 0 ▷ Current Max.weight of gcd of policies
    flag ← false
    for each child c of r do
        if s.temp ∧ c ∈ s.set then
            flag ← true
        end if
        if (!s.temp ∧ c ≠ s) ∨ (s.temp ∧ c ∉ s.set) then
            tempp ← gcd(c.p, s.p)
            tempw ← weight of tempp
            if cmax < temp_w then
                Empty S; Push(s, c)
                Sgcd ← gcd(s, c)
                cmax ← tempw
            else if cmax = tempw then
                Sgcd ← gcd(Sgcd, c)
                Sgcdweight ← weight of Sgcd
                if Sgcdweight = cmax then
                    Push(S, c)
                end if
            end if
        end if
    end for
    if !S.isempty ∧ cmax ≠ r.weight ∧ s.temp ∧ flag
    then
            Push(S, s.set)
            while S ≠ ∅ do
                snew ← snew ∪ Pop(S)
            end while
    end if
    if !S.isempty ∧ c_{max} ≠ r.weight ∧ !s.temp then
        Push(S, s)
        while S ≠ ∅ do
            snew ← snew ∪ Pop(S)
        end while
    end if
    end if
    return snew
end function
```

During the execution of the ADD-NODESET-TO-G function, while evaluating a set s∈T, let the root r have $c_1, c_2, \ldots, c_k$ child nodes. Let $g_1$=GCD($c_1$, s), $g_2$=GCD($c_2$, s), ..., $g_k$=GCD($c_k$, s) be the GCD of policies of s with the child nodes $c_1, c_2, \ldots, c_k$. Let cmax be the maximum weight over all the weights of the policies $g_1, g_2, \ldots, g_k$. Then the primary objective of the CURR-MAX-WEIGHT-SET function is to compute the set (not necessarily the largest) of all child nodes smax={$c_{i1}, c_{i2}, \ldots, c_{il}$} such that smax⊆{$c_1, c_2, \ldots, c_k$}, and gcd($c_{i1}, c_{i2}, \ldots, c_{il}$, s) has cmax weight.

To compute snew, CURR-MAX-WEIGHT-SET function maintains a stack S (this can also be achieved with an array/list). Initially, S is empty and cmax=0. While evaluating the child nodes of r, S contains the nodes having the current/local maximum weight. Therefore, by the end of the for loop, S contains all the child nodes, such that the weight of the GCD of their policies is cmax. snew contains the largest possible set of nodes if cmax=s·weight. However, if cmax≠s·weight, it does not necessary store the largest set. This is not a problem, as a node corresponding to cmax is added as a temporary node (if s is a permanent node) to F, in which case it is evaluated later and the maximum possible set of nodes corresponding to it, is formed at that time. Note that, s is not considered while computing this set, because GCD $(s,s) \geq GCD(c_i,s)$, where $1 \leq i \leq k$. Hence, if s is included in the set, cmax=s·weight. This would be a problem if snew={s}, as it cannot form a segment with only one element. Therefore, S is determined without considering s and if $S \neq \emptyset$ we add s to it. Furthermore, if cmax is equal to the weight of the root, it is not efficient to create another sub segment with its weight equal to r·weight. Therefore, this case is disregarded.

The ATTACH-RESOURCES-TO-R procedure attaches resources having the same weight as r to r.

```
procedure ATTACH-RESOURCES-TO-R(G, T)
    G = (V; E; r)
    for each s ∈ T ∧ !s.temp do
        if !s.isresource then
            for each res ∈ s.set do
                res = CREATE-NODE(res)
                ADD-NODE-TO-G(G, res, ∅, false)
            end for
        else
            ADD-NODE-TO-G(G, s, ∅, false)
        end if
    end for
end procedure
```

In some cases, an auxiliary procedure ADD-NODE-TO-G can be used and the function CREATE-NODE can be used by the Poly-RNS algorithm. The auxiliary ADD-NODE-TO-G procedure encapsulates the steps to add nodes (and any resources not already added to G in its set attribute) to G. The ADD-NODE-TO-G procedure always adds the node s to the root of r (if it exists). If s is a GCD node and has children that are resource nodes not added to G yet (indicated by exist=false), then s is added to G and all the resources in its s.set are created as new nodes and added to G, as children of s. If s is a GCD node object, which is created to be a GCD node for existing nodes in G (indicated by exist=true), then s is added to G and all nodes in cset are added as its children (this includes removing their connection with r, and attaching them to s). In this case, it is possible for cset to contain a node having the same weight as that of s, in which case, that node is deleted from G, and attach its children to s.

```
procedure ADD-NODE-TO-G(G, s, cset, exist)
    if G ≠ NULL then
        V ← V ∪ s; E = E ∪ {(r, s)}
        s.π ← s.π ∪ {r}
    else
        if s.set = R then
            V ← V ∪ s; r ← s
        end if
    end if
    if s.set ≠ empty ∧ s ≠ r ∧ ! exist then ▷ Add gcd
    node with only resources not yet added to G as children
        for each res ∈ s.set do
            res = CREATE-NODE(res, ∅, false)
            V ← V ∪ res
            E ← E ∪ {(s, res)}
            res.π ← res.π ∪ {s}
        end for
    else if cset ≠ empty ∧ s ≠ r ∧ exist then ▷ Adding
    gcd node with children already added to G and possibly
    having gcd nodes as children.
        for each res ∈ cset do
            if res.isresource = false ∧ s.weight =
                res.weight then
                    V ← V - {res}
                    E ← E - {(r, res)}
                    for each child c of res do
                        E ← E - {(res, c)} ∪ {(s, c)}
                        res.π ← res.π - {res} ∪ {s}
                    end for
                else
                    E ← E - {(r, res)} ∪ {(s, res)}
                    res.π ← res.π - {r} ∪ {s}
                end if
            end for
```

The auxiliary CREATE-NODE function creates nodes so that they can be added to the graph G. While building G, two types of nodes, namely the resource nodes, and the GCD nodes (firewall) are created, and their attributes set according to the code given in the CREATE-NODE function. Since nodes are marked as temporary (nodes that are added to F and evaluated later) a new attribute is introduced, temp, which is added to all nodes. For permanent nodes, temp is set to false, and for temporary nodes, temp is set to true.

```
function CREATE-NODE(s)
    Create node v       ▷ Create node and initialize attribute
    values
    if |s| = 1 ∧ s ≠ R then         ▷ Adding a resource
        v.p ← policy of resource s
        v.weight ← weight of v.p
        v.set ← ∅; v.size ← 0
        v.isresource ← true; v.temp ← false
    else
        v.p ← GCD of all resource policies in s
        v.weight ← weight of v.p
        v.isresource ← false; v.temp ← false
        for each node ∈ s do
            if !node.isresource then
                v.set ← v.set ∪ node.set
                v.size ← v.size + node.size
            else
                v.set ← v.set ∪ node
                v.size ← v.size + 1
            end if
        end for
    end if
    return v
end function
```

Figure 8A:
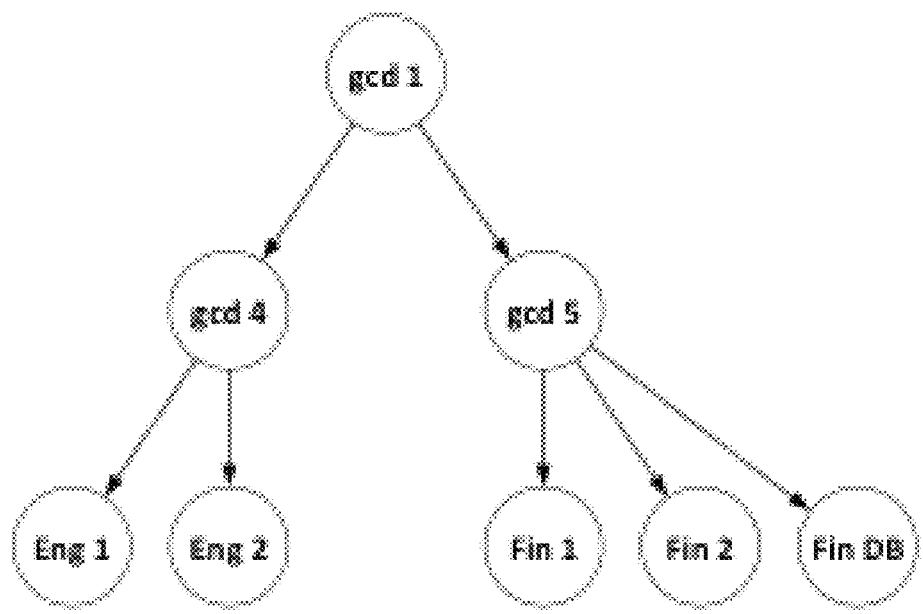
FIGS. 8A to 8C are diagrams showing an example progression of building rooted connected directed acyclic graphs to a network topology using the system of FIG. 2.
Figure 8B:
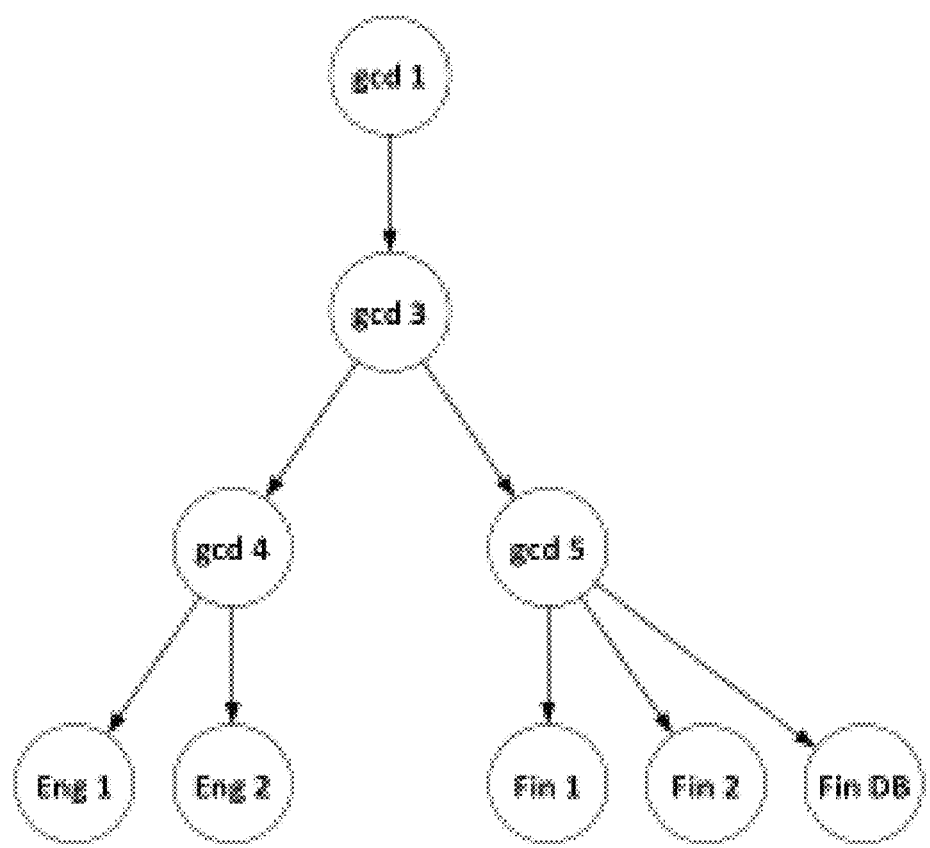
Figure 8C:
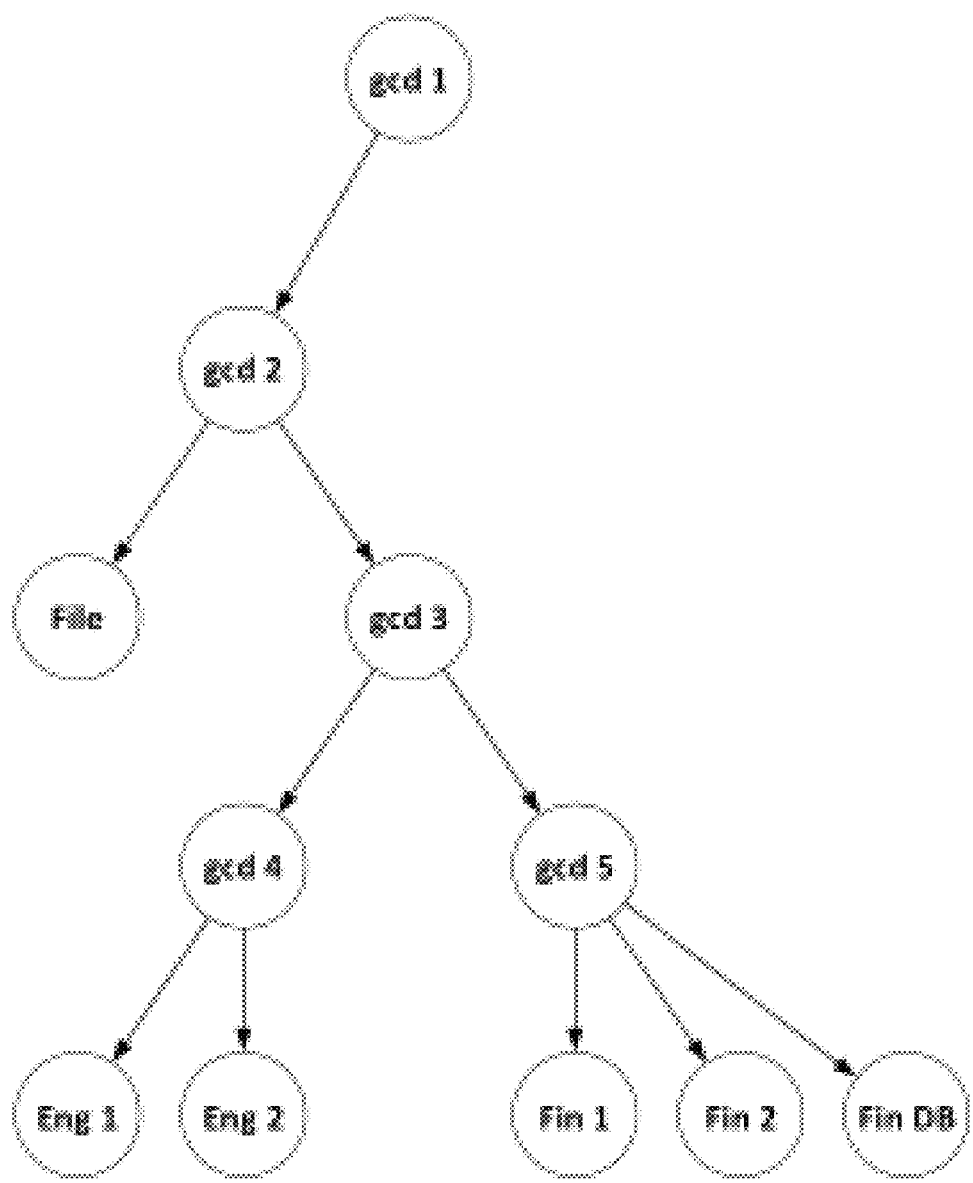

FIGS. 8A to 8C show the progression of executing the Poly-RNS algorithm on an illustrative example. The last iteration generates the network shown in FIG. 7. FIG. 8A is a graph after a $1^{st}$ iteration of ADD-NODE-TO-G, while FIG. 8B is a graph after a $2^{nd}$ iteration of ADD-NODE-TO-G, and FIG. 8C is a network graph after a $3^{rd}$ iteration of ADD-NODE-TO-G, and represents the network topology.

The Poly-RNS algorithm described herein constructs a robust network topology represented by graph G, as proved by the present inventors. As proof, suppose Condition 1 is not satisfied. Then there exists at least one path in G from the root to the parent of a resource, such that the SDD strategy is not satisfied. In the Poly-RNS algorithm, the root is added first to an empty graph G. After which nodes both resource and GCD nodes are added in non-increasing order of their weights to G by first attaching them to the root only in the ADD-NODESET-TO-G procedure. In ADD-NODESET-TO-G, when a GCD node GCD is added to the root r, cset contains all its child nodes. The policy at GCD is equal to the GCD of policies of all nodes in cset. Furthermore, while adding child nodes from cset to GCD, it can be checked if any child node's weight is equal to GCD·weight, in which case the child node can be removed (if it's not a resource) and attach all its children to GCD. Therefore, in all the cases the SDD strategy is satisfied while adding resources and GCD nodes. Therefore, the SDD strategy is satisfied in all paths from the root to the node of the parent of a resource, which is a contradiction.

Suppose Condition 2 is not satisfied. Then, there exists a segment S, such that a resource r∈S and a resource r'∉S have commonalities with more weight than the weight of the commonalities between elements of the segment S. Without loss of generality, let us assume that w(p(r))≤w(p(r')). Nodes are added to G in non-increasing order of their weights. Therefore, when r is added to G, all the existing nodes in G have weight greater than or equal to r·weight. Since r·weight≤r'·weight, while evaluating clusters of resources containing r, G must include r'. Further, while evaluating these clusters of resources, having weight greater than or equal to r·weight and including r, we choose a cluster having the maximum weight (and possibly the maximum size) among all such clusters evaluated, to be the segment S. Therefore, it must be the case that a cluster having r and r' is evaluated. Since r and r' have commonalities with higher weight (hypothesis), then the chosen cluster forming a segment must contain r and r'. Therefore, the segment S must contain both r, r', which is a contradiction Suppose Condition 3 is not satisfied; that is, superfluous firewall chaining exists in G. Then there exists at least one firewall/GCD node with a single node that is a firewall attached. Recall that GCD nodes are added to G only when more than one node can be attached to them. Therefore, by the end of the Poly-RNS algorithm, G has no superfluous firewalls, which is a contradiction.

Let $R=\{r_1, r_2, \ldots, r_n\}$ be the input of size n to the Poly-RNS Algorithm. Then, the running time of Poly-RNS is O(n2). Using numeral key values between 1-m as labels for distinct rules in R, and Bucket sort, the time required to compute the subsets $S_1, S_2, \ldots, S_m$ where m∂n is O(n). Since GCD nodes (either permanent or temporary) are created for each set $s \in S_1, S_2, \ldots, S_m$ exactly once, the number of GCD nodes in G is at most n. Analogously, the number of temporary nodes created during the execution of the Poly-RNS algorithm is also at most n. Hence the total time required for the Poly-RNS algorithm is O(n), plus the total time required to execute the ADD-NODESET-TO-G} procedure. Let t∂n be the number of distinct weights of policies in the resource set R. Then, the ADD-NODESET-TO-G procedure is executed t times, and the total number of nodes processed by it is at most 2n (since |F|∂2n). Hence the time taken by ADD-NODESET-TO-G} is 2n plus the time taken by the CURR-MAX-WEIGHT-SET for each node s∈F, where s·weight>r·weight. The total time required by the CURR-MAX-WEIGHT-SET procedure is equal to the number of child nodes of r the procedure evaluates to construct the snew set for all nodes in F. The maximum number of such nodes is at most 2n (total number of nodes in G) at each execution of the CURR-MAX-WEIGHT-SET procedure. Further, the CURR-MAX-WEIGHT-SET procedure is executed at most 2n times (number of nodes in F). Hence, the total time required by the CURR-MAX-WEIGHT-SET procedure is at most $O(n^2)$. Therefore, the total running time for the Poly-RNS Algorithm is $O(n^2)$.

The present embodiments provide an approach for network segmentation and an algorithm to build a robust network architecture which segments resources such that maximum access-control protection is provided to its resources. The approach of the present embodiments is based on the mathematical framework of PFA, where a policy is treated as a product and the sets of policies governing a firewall are equivalent to product families, and an atomic rule in a policy is equivalent to a feature. The rules in policies are modelled as guarded commands. The RNS Algorithm uses the GCD and the refinement relations, described herein, to segment resources and build a robust network.

The advantage of building a robust network using the RNS Algorithm is that public facing resources are placed close to the edge of the network and have limited access to internal resources. While resources requiring more security are placed farther from the edge of the network and protected by many layers. Furthermore, access from one segment to the other is controlled by internal firewalls and a mathematical rationale for it is provided. Moreover, the advantage of having a formal treatment of the problem allows for the automation of the solution. By automating the solution, networks with huge number of resources can be handled efficiently.

In some cases, a network can have multiple access/entry points. The RNS algorithm may be modified to consider these scenarios.

As apparent to those skilled in the art, the RNS Algorithm could be scaled to enforce additional requirements/constraints on the segmentation to achieve the desired protection. For example, an organization can limit the number of levels required. Furthermore, additional measures can be added to achieve the desired segmentation, for example risk assessment measures such as: infection spread ratio and cleansing time. Note that these additional factors can be incorporated in the weight function discussed herein.

Software-defined networking (SDN) is a network architecture that allows the control of a network using software applications, which takes the stateful control to higher levels by involving several of the attributes of the network and its traffic into the control. OpenFlow protocol is a communication protocol that gives the control plane access to the forwarding/data plane devices. The control plane decides on how the traffic is handled using a dedicated program called the controller. The data plane devices forward traffic based on the decisions of the control plane. This separates the concern of the control from that of the execution of the control decisions. This separation of concerns has the benefit of allowing the controller to dynamically and simultaneously manage multiple network nodes. Moreover, it brings, as stated above, advantages to network management such as the ease of modifiability and the ease of testing. These advantages come with several challenges especially related to the security of the network, such as the vulnerability of the network to man-in-the-middle attack and denial-of-service (DOS) attacks.

As described, in a network of computing resources, a security system to be effective should adhere to the strategies of layered protection (i.e., layered defence) and segmentation (i.e., compartmentalization). Layered protection means having multiple firewalls consecutively on the traffic path. On the other hand, segmentation refers to grouping resources into clusters of "similar" security requirements, which would help in providing the resources in a segment with the same defence mechanisms. By adopting the two strategies, there are resources segmented into different segments that are protected by layers of firewalls. Moreover, segments are placed into the network based on the strength of their security requirements. Therefore, segments with higher security requirements are placed deeper in the network while segments with lower requirements are placed close to the network's entry point. These two strategies have been formalised and implemented in the RNS approach described herein; which provides a systematic approach to segment network resources into clusters and provides the network topology that indicates the placement of these clusters in the network. Given a set of resource policies, the RNS invokes algebraic calculations to generate a topology of the network in which the resources under consideration ought to be organized. Moreover, it generates the policies that are to be enforced by the firewalls. The RNS approach can be used in software-defined networking (SDN) environments to create the data plane topology and to assign policies to be enforced by the switches. Moreover, it could also be used to segment large networks into multiple sub-networks with multiple controllers. The RNS approach and its interfaces to the data plane and the control plane can form a module for dynamic configuration and governance (DCG) of the network; which can be referred to as a 'DCG plane'. In some cases, the DCG plane can forms a layer at the same level as the Application Plane; as exemplified in FIG. 9, which shows an example SDN architecture.

Modern networks are very dynamic with resources that are added and removed frequently, which leads to a change of the network. The RNS approach of the present embodiments can be used in real-time for this dynamic configuration of the network as it evolves. For instance, resources in internet of things (IOT) are very dynamic: frequently connect to and disconnect from the network. This leads to the necessity of dynamic control on the access to the network. A policy that is defined for the network at a time t might become irrelevant at a later time t+δ(t). Recalculating the topology of the network and the policies for its firewalls as the involved resources or their policies change leads to changes in the network topology. The latter change entails reconfiguration of the control at the control plane, or data plane if some of the control is delegated to the switches. Hence, it is advantageous to assess the effect of a dynamic amendment of the control on the network performance. The present embodiments provide solutions for at least two substantial challenges relating to dynamic networks:

1) How can the system separate the management of the dynamic aspects of an SDN in a real-time setting from the control and the data related issues?
    To address this issue, the system applies the principle of separation of concern using an additional plane (DCG plane) that specializes in reconfiguring the network following changes to its resources or their policies.
2) What SDN architecture is the most suitable for dynamic networks?
    The present disclosure provides assessments of three exemplary SDN architectures.

To assess the efficiency of using the DCG plane that is supported by the RNS algorithm in the SDN. For this purpose, three SDN architectures can be constructed using, for example, Mininet that conform to the topology determined by the RNS algorithm. Since in the SDN network the firewalls can be placed either at the control plane or the data plane, at least three possible implementations for the firewalls can be used that calculated by the RNS algorithm:

Architecture 1: A single and centralised stateful firewall located at the control plane. The firewall governs all the data plane switches.
Architecture 2: Multiple distributed stateful firewalls located at the control plane. Each of the firewalls is assigned to a unique switch at the data plane. Hence, there are as many firewalls as switches.
Architecture 3: Multiple distributed stateful firewalls located at the data plane. Each switch is transformed into a stateful firewall.

For example, in SDN, the RNS algorithm can be used within the three above architectures as a component of the DCG plane to handle dynamic changes to a network. Performance of the above architectures were examined by the present inventors amongst the following attributes:

Setup cost: It is evaluated by the number of packets exchanged between control and data planes during the setup phase.
Reachability: To test the effectiveness of the enforced policies, a ping utility can be used such that each host tries to reach every other host in the network.
Response time or latency: The ping utility can be used to find the time needed for the communication between two selected nodes.
Bandwidth: Bandwidth if tested using, for example, iPerf TCP test to obtain the bandwidth for the link under consideration.
Latency variation (jitter): Latency variation can be tested using, for example iPerf UDP test for any link under consideration.
Resilience to topology change: resilience can be measured by the number of packets exchanged to fulfill an intended topology change.

The present embodiments advantageously use the RNS algorithm as a component of the DCG plane in the SDN; which has been determined to be substantially useful for a dynamic SDN. The RNS algorithm in SDN can be used for the implementation of the three architectures described above, amongst others. The present inventors determined that when the network is very dynamic, Architecture 2 provides the most advantages. For a relatively stable network, Architecture 3 was determined to provide the most advantages. Although it has the highest cost in the setup and the update phases, in the operation phase it does not need any communication between the control and the data plane.

In traditional networks, the control plane and the data plane are combined in the same network device. Therefore, network administrators need to configure each device separately. This approach makes traditional networks hard to setup, maintain and manage. Moreover, traditional networks cannot cope with the demands of modern networks such as dynamic changes and scalability. Advantageously, SDN separates or decouples the control plane from the data plane. The control or the management is centralized and has a global view of the network. Data plane devices (e.g., switches) act as dummy forwarding devices that forward traffic based on rules specified remotely. The rules could be coming from applications and are triggered by information extracted from traffic or traffic events.

Figure 9:
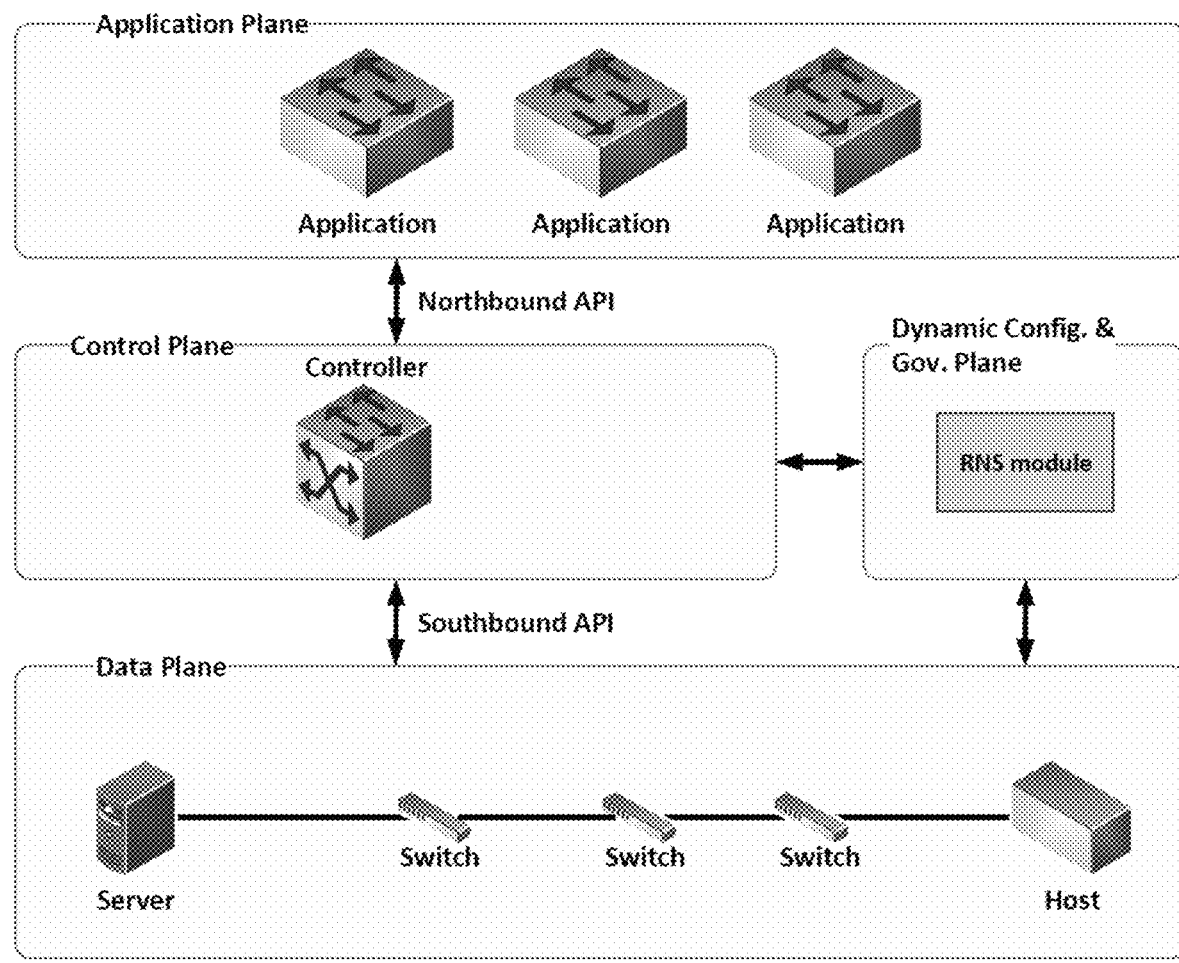
FIG. 9 is a diagram of an example of a software-defined networking (SDN) architecture in accordance with the system of FIG. 2.

SDN architecture consists of three planes: application plane, control plane, and data plane, as shown in FIG. 9. The system 100 advantageously uses an additional plane, which is the DCG plane. Each plane has its own specific functionality. An SDN network has at least a single controller at the control plane, a northbound application programming interface (API) between the control plane and the application plane, and a southbound interface between the control and data planes. The system 100 advantageously uses an interface between the control plane and the DCG plane, as well as an interface between the data plane and the DCG plane.

The data plane has network devices (e.g., switches) that forward packets without taking decisions on their own, and they communicate with the controller using southbound APIs (e.g., OpenFlow protocol). Each switch has a flow table, and each entry in the flow table has matching fields, action, and counters. The matching fields can be any of the packet header attributes, such as source mac address, source IP address, destination MAC address, destination IP address, destination port, protocol, etc. A flow table entry can execute many actions, including forward the packet on a specific port, forward packet to controller, or drop. Flow table entries have priority to specify the order of the evaluation. An entry with high priority gets evaluated first, and an entry with low priority is evaluated later. SDN architecture allows for the use of software switches.

The southbound API is the interface between the control plane and the data plane network devices. In an example, OpenFlow can be used as the southbound API. There are multiple OpenFlow messages that can be sent from the data plane devices to the controller including packet-in, switch features reply, flow remove, etc. The OpenFlow messages from the controller to data plane switches include packet-out and add flow.

SDN control plane runs the object name service (ONS) which has a global view of the network and configures network devices based on policies and commands defined by applications. It also abstracts the low level/data plane network for the application plane. There are two types of controller architectures: centralized and distributed. The centralized controller architecture has a single controller responsible for managing data plane devices. SDN distributed controller architecture has multiple controllers with interfaces between them.

Figure 10:
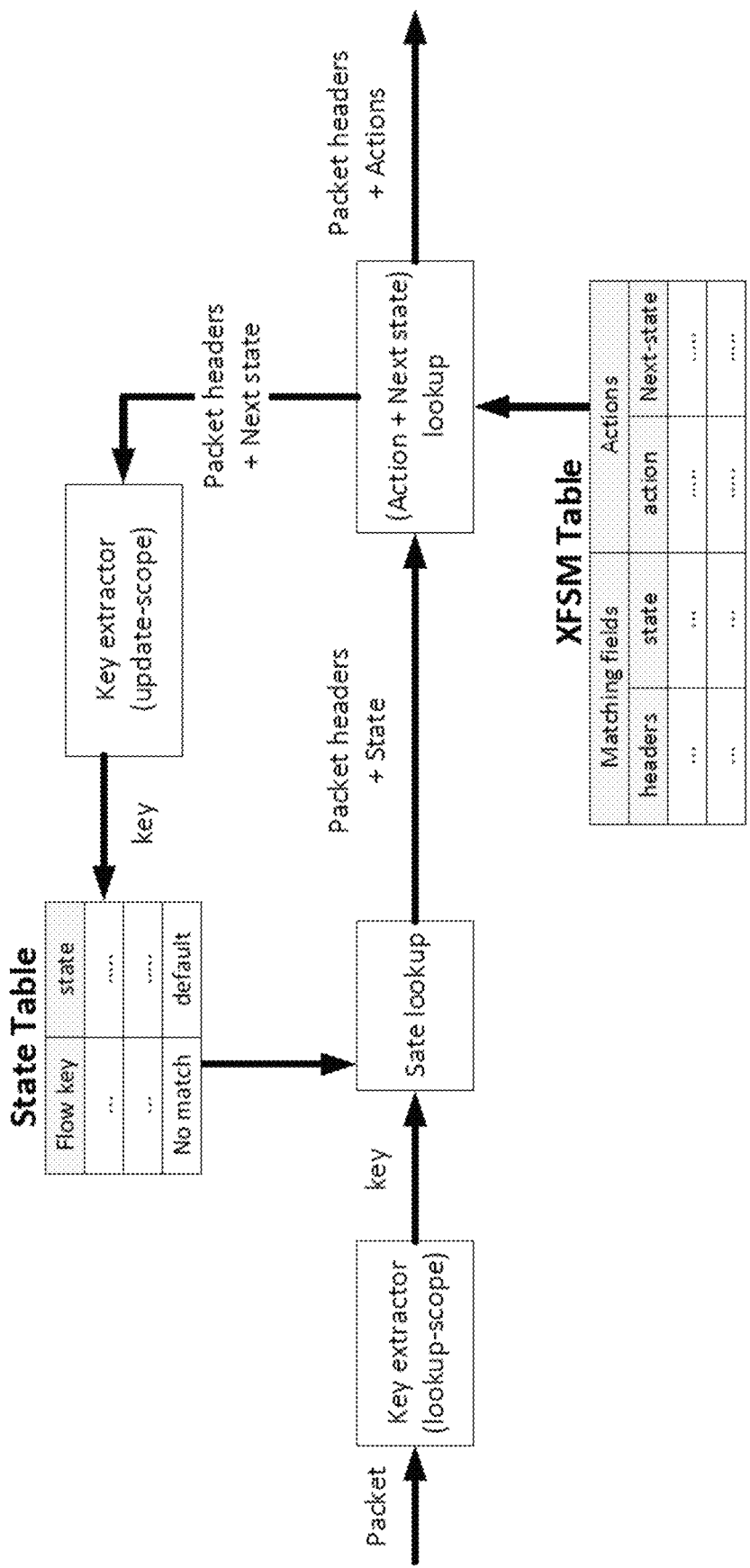
FIG. 10 is an example of a packet flow diagram.

In general, SDN architectures, data plane switches are stateless. For SDN to handle stateful communications, switches need to forward heavy traffic to the controller. This results in a controller overhead and latency in response time. Stateful data plane approaches allow data plane switches to track stateful connections and therefore take some load off the controller which results in less latency. In an example, OpenState is a stateful data plane abstraction that extends OpenFlow to handle stateful connections at the data plane. Some simple operations can be done based on the switch knowledge and can be delegated to the switches, therefore allowing the controller to focus on global network decisions. The controller is still informed of the delegated operations and remains in control of the switches. As shown in the example of FIG. 10, each switch holds two tables: state table and XFSM table. The state table keeps track of the state of the connection. XFSM is a Mealy Machine and the XFSM table is the tabular representation of its transition function. For a packet and its current state, OpenState uses an XFSM table to identify the action to be taken and the new state. In an example, a BEBA software switch can be used to extend OpenState to handle TCP flags in the implementation of Architecture 3. In is understood that other approaches can use more than two tables.

Generally, there is an emphasis on whole SDN architecture and on control plane structure. With respect to SDN data plane structure, data plane flexibility can be determined. Data plane flexibility refers to, among other things, adding and removing resources (i.e., changing the topology). The issue of micro-segmentation and slicing is also applicable to data plane structure. Network slicing and micro-segmentation are two related concepts concerning isolating parts of the network from each other. Network slicing is the instantiation of a complete end-to-end logical self-contained network with all its functionalities for a specific service or application. Micro-segmentation provides finer-grained isolation of network parts. It allows for dividing networks into finer segments up to an individual machine level and defining security control policies for each segment and therefore limiting lateral traffic movement between segments.

The present embodiments advantageously provide topology and firewall policies as determined by the RNS algorithm to structure the data plane. Advantageously, the present embodiments can automatically, and without human involvement, segment the resources at the data plane.

Resources in modern networks are dynamic as they join and leave the network at various times. Many other approaches to handle dynamic networks focus on routing and load-balancing in the control plane and data plane. In contrast, the present embodiments consider a dynamic topology of the network: Resources can get added and removed and the structure of the networks changes by changing the locations of the switches and their policies. The dynamism that are considered are related to the network topology and the access policies that regulate its access.

Modern networks and related technologies, such as IOT, 5G, SDN and network functions virtualization (NFV), have experienced exponential growth. However, security challenges can limit the growth of such technologies. These challenges are the result of the nature of the vulnerabilities of the environment. One of the characteristics of such an environment is its dynamism. To mitigate against the changing security threats and the dynamic nature of the environment, security solutions should be adaptive. The static security solutions of traditional networks are not sufficient to provide security for such changing and evolving environment. Advantageously, the present inventors determined that the DCG plane provides adaptive security that allows automatically reconfiguring a network as the security situation requires.

Generally, architectures for designs with firewalls in SDN can be either stateless or stateful, centralised or distributed, and whether the firewalls reside at the data plane or the control plane.

Generally, designs of single stateless firewalls have rules that are entered individually and given a name by the user through the command-line interface (CLI), which makes this architecture limited in handling a policy with a large number of rules. Moreover, in this architecture, all traffic is handled by the firewall at the control plane except for limited deny rules which are inserted in the switch flow tables. This manual approach for entering the rules would have limited usage in a large dynamic network. It has a scalability limitation as all the traffic is assessed by the firewall at the control plane. There is a high coupling between all the switches and the firewall.

Generally, architecture for use in distributed stateless firewalls use only a single firewall at the control plane, and insert deny rules in the switches at the data plane. In some approaches, the controller assigns a firewall module for each switch. Each firewall inserts deny rules in the switch, such that the switch drops unwanted traffic without forwarding the packets to the controller. When a packet arrives at a switch with no entry in its flow table to handle the packet, it forwards the packet to the firewall at the controller. The latter firewall instructs the switch on how to forward the packet and insert an entry to handle such packets in the future. Such an approach is relatively basic and does not take the state of the connection into account and blocks traffic in both directions. However, in real settings, it is desirable to allow traffic in one direction and block traffic in the other direction. While these architectures enable distributed firewalls, they are stateless, which does not meet most needs in order to implement a stateful firewall. Stateless firewalls are not able to block packets that are not part of an established connection and therefore not able to protect from fake packets. Moreover, stateless firewalls block traffic in both ways, while in real scenarios, it is required to allow traffic initiated from the internal network and allow outside reply traffic while block traffic initiated from outside to internal resources. Stateful firewalls keep track of the connection state and therefore block packets that are not part of an established connection. Moreover, they allow for one-direction traffic. Firewalls at the control plane suffer potentially from controller overhead and scalability issues because of the amount of traffic needed to be forwarded to the controller.

Some approaches implement distributed stateful firewalls at the data plane switches. These approaches take a load off the controller by putting the stateful firewall logic in the data plane switches. However, these approaches are costly in the setup and maintenance phases. In some cases, they are also limiting, such as limited to only the TCP protocol.

Network functions virtualization (NFV) is an approach to decouple network functions (e.g., firewall, load balancer, network address translation (NAT), or web proxy) from its dedicated hardware. Then, the network functions are implemented as software instances running on powerful servers. It is claimed that NFV together with cloud platforms enable building flexible virtual networks (VN). It deals with changes of VN by ensuring that the virtual firewalls be properly amended to ensure the protection of the resources. Based on heuristics, some mechanisms were designed to dynamically adapt virtual firewalls to VN changes. However, these mechanisms cannot be easily fully automated. The RNS algorithm could play an important role in the process of dynamically adapting virtual firewalls to VN changes. In this sense, the RNS algorithm could be a part of an NFV enabling the virtualization of firewalls. In some approaches, three architectures can be used to implement stateful firewalling with NFV and SDN: Controller-Centric Approach, VNF-Centric Approach, and Hybrid SDN/NFV Approach. The Controller-Centric Approach exploits the capabilities of SDN switches for implementing the data plane firewall functionality. In this case, the firewall could play the role of DCG plane. However, the DCG plane is specialized in network segmentation and automatic generation of bulletproof (access-wise) policies for the firewalls. In the VNF-Centric Approach and the Hybrid SDN/NFV, the VNF approach relies on virtualized firewalls that are deployed in a cloud environment. In this case too, the DCG plane of the present embodiments can be a part of a virtual firewall component in the architectures (VNF-Centric and Hybrid SDN/NFV).

To ensure a network segmentation that guarantees the best structure and configuration of the network, the RNS algorithm, exemplified in Algorithm 2, undertaken by the system 100, takes a set of resources and their individual access control policies, then it derives the topology of the network that connects them to one entry point allowing authorised access to each of them. It determines the policies to be executed at the firewalls on the paths to the resources from the entry point such that there is, in most cases, defence in depth and an access control protection that is robust. The topology obtained by the algorithm, and the segmentation it entails, ensures the robustness of the network. PFA can be used to calculate the topology and the firewall policies. In determining the topology and the policies for the firewalls, the RNS algorithm works out a segmentation of the resources such that resources of similar access control policies are grouped under the same firewall. The placement of firewalls is determined by the notion of refinement on families of policies.

The commonalities between policies can be determined using their GCD as presented in PFA. Firewalls have to enforce common policies. For instance, if all the policies associated with the resources under a firewall deny access for any traffic coming from a range of IPs, then the firewall will deny all the traffic coming from this considered range of IPs. If a resource is taken from a segment and arbitrarily moved to another segment, then the weight associated with the access control policy of the firewall protecting its initial segment will be higher than the weight of the segment it has been moved to. In ranking policies of the firewalls, weights are given to the different security requirements. For instance, if traffic from an internal resource is deemed less dangerous than that from an external one, the weight will take into account this requirement.

In most cases, the RNS algorithm of the present embodiments can be a polynomial algorithm that is efficient in calculating a network topology and the policies of its firewalls.

Hence, it could be easily used to reconfigure dynamic networks. For instance, at each change of the availability or the policies of the network resources, the RNS algorithm can be used to quickly recalculate the topology and the new firewall policies. Then, the network is changed to have the determined topology and to enforce the new calculated firewall policies. The RNS algorithm is located conceptually at the DCG plane, which is responsible for amending the network configuration and the network access control policies. It dynamically determines changes to the network topology and the policies of its firewalls to ensure proper, almost real-time, secure governance.

Unlike other approaches, the RNS algorithm of the present embodiments is based on rigorous algebraic calculations that provide a formal approach to achieve network segmentation. Other approaches generally lack the ability to automate the derivation of the best solution for network segmentation and prove its correctness. In contrast, the RNS algorithm deals well with the dynamic nature of networks. At each change of the network topology or policies, the RNS algorithm determines and outputs the amendments to the topology, distribution of the firewalls, and the policies needed to enforce. The output of the RNS algorithm (i.e., topology and firewall policies) achieves the principle of layered defence. Moreover, the firewall policies on every path from the entry point to resources get stricter by reducing the attack surface as it goes deeper into the network. The focus of internal firewalls is then on monitoring and controlling internal traffic and lateral movement, which enhances the overall network performance.

In the system, the RNS algorithm is implemented in the RNS module 128 located conceptually at the DCG plane. In the context of SDN, the RNS module 128 generates the data plane topology and structure. In some cases, determinations are performed for how many switches are needed, where they should be placed, and the links between resources and switches. In some cases, policies can be generated to be enforced at each switch. In the case of a policy or topology change, the DCG plane gets notified and re-executes the RNS module 128 dynamically to generate the updated topology and firewall policies. The updates are then carried to the data plane topology and the firewall policies are updated.

Figure 11:
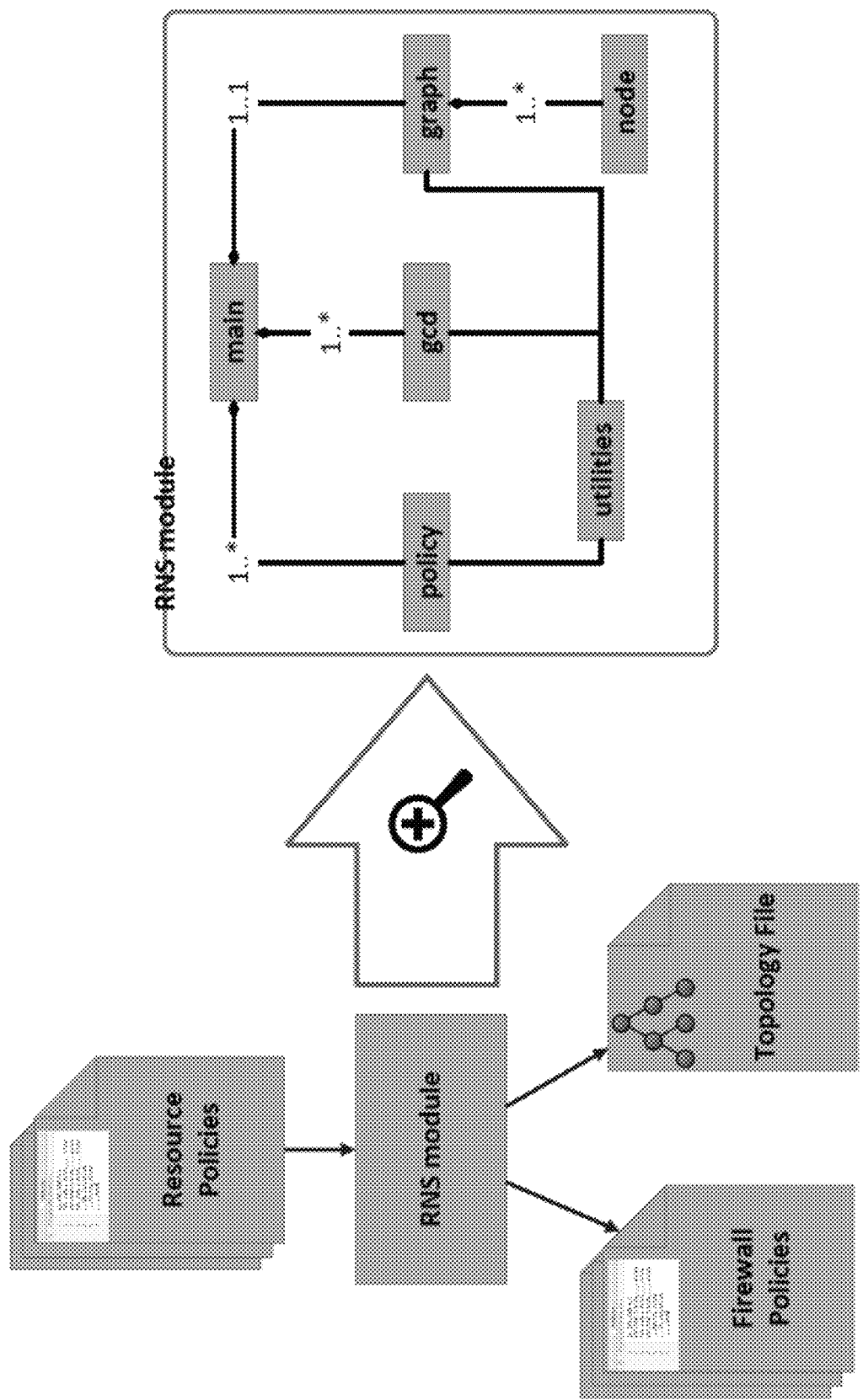
FIG. 11 is a diagram of an example of a structure of a robust network and segmentation (RNS) module.

In a particular case, the RNS module 128 at the DCG plane consists of six classes, as illustrated in the diagram of FIG. 11. A main class, a class for storing and manipulating policies, a class for storing and calculating GCD of the families of policies, and a class for storing and generating the network topology, in this case represented as a graph, that uses a node class. In some cases, there is also a utility class that encompasses useful approaches used by the classes of the RNS module 128. In some cases, the RNS module 128 can be provided with a list of resource names along with their policy files. In the policy file, the first line indicates the IP address of the resource and the rest provides the policy by sequentially stating the rules. In an example, the grammar of the firewall rules is given as follows:

⟨rule⟩→[⟨source_ip⟩],[⟨source_port⟩],[⟨destination_ip⟩],[⟨destination_port⟩],[⟨protocol⟩],⟨action⟩

⟨source_ip⟩→⟨ip_number⟩|⟨sub_network⟩

⟨source_port⟩→⟨port_number⟩|⟨port_range⟩

⟨destination_ip⟩→⟨ip_number⟩|⟨sub_network⟩

⟨destination_port⟩→⟨port_number⟩|⟨port_range⟩

⟨protocol⟩→TCP|UDP|ICMP|all

⟨action⟩→allow|deny

⟨sub_network⟩→⟨ip_number⟩/⟨dgits⟩

⟨ip_number⟩→⟨8bit_digit⟩·⟨8bit_digit⟩·⟨8bit_digit⟩·⟨8bit_digit⟩

⟨8bit_digit⟩→0-255

⟨port_range⟩→⟨port_number⟩:⟨port_number⟩

⟨port_number⟩→⟨digits⟩

⟨digits⟩→⟨digit⟩|⟨digit⟩|⟨digits⟩

In most cases, the RNS algorithm (Algorithm 2) is capable of handling grammar.

In the above example, the non-terminals ⟨source_ip⟩ and ⟨destination_ip⟩ can be optional, indicating the source IP address and destination IP address, respectively. They can be a specific resource IP address, a network, or a sub-network. When these non-terminals are not given, it indicates the IP address that covers all IP domain (i.e., 0.0.0.0/0). The non-terminals ⟨source_port⟩ and ⟨destination_port⟩ are optional indicating the source and destination ports, respectively. They can be a specific port or a range of ports. When not provided, it indicates the whole range of possible ports (i.e., 0 to 65535). The non-terminal ⟨protocol⟩ is optional and indicates the communication protocol. The non-terminal can be a specific protocol (i.e., TCP, UDP, or ICMP) or "all" which indicates all protocols. When no value is given for this field, it indicates the "all" value. The non-terminal ⟨action⟩ is the only mandatory one which indicates the action to be taken by the switch. The possible values in some cases are allow or deny which instruct the switch to forward the packet to its destination or drop the packet, respectively.

The RNS module 128 at the DCG plane can be used to create a policy object for each resource. The policy object reads a policy file and stores the policy. It transforms the sequential rules into disjoint rules such that executing them in any order produces a consistent policy. It does the transformation as it reads rules one by one from the policy file. If a new rule has a domain that intersects with that of an already existing rule, the intersected part is removed from the new rule as it already exists in another rule. The policy object can use a weight function to calculate and stores the weight of the policy. The RNS module 128 proceeds to implement the RNS algorithm. In the case of a policy or topology change, the DCG plane gets notified and re-executes the RNS module 128 dynamically to generate the updated topology and firewall policies. The updates are then carried to the data plane topology and firewall policies are updated.

Figure 12:
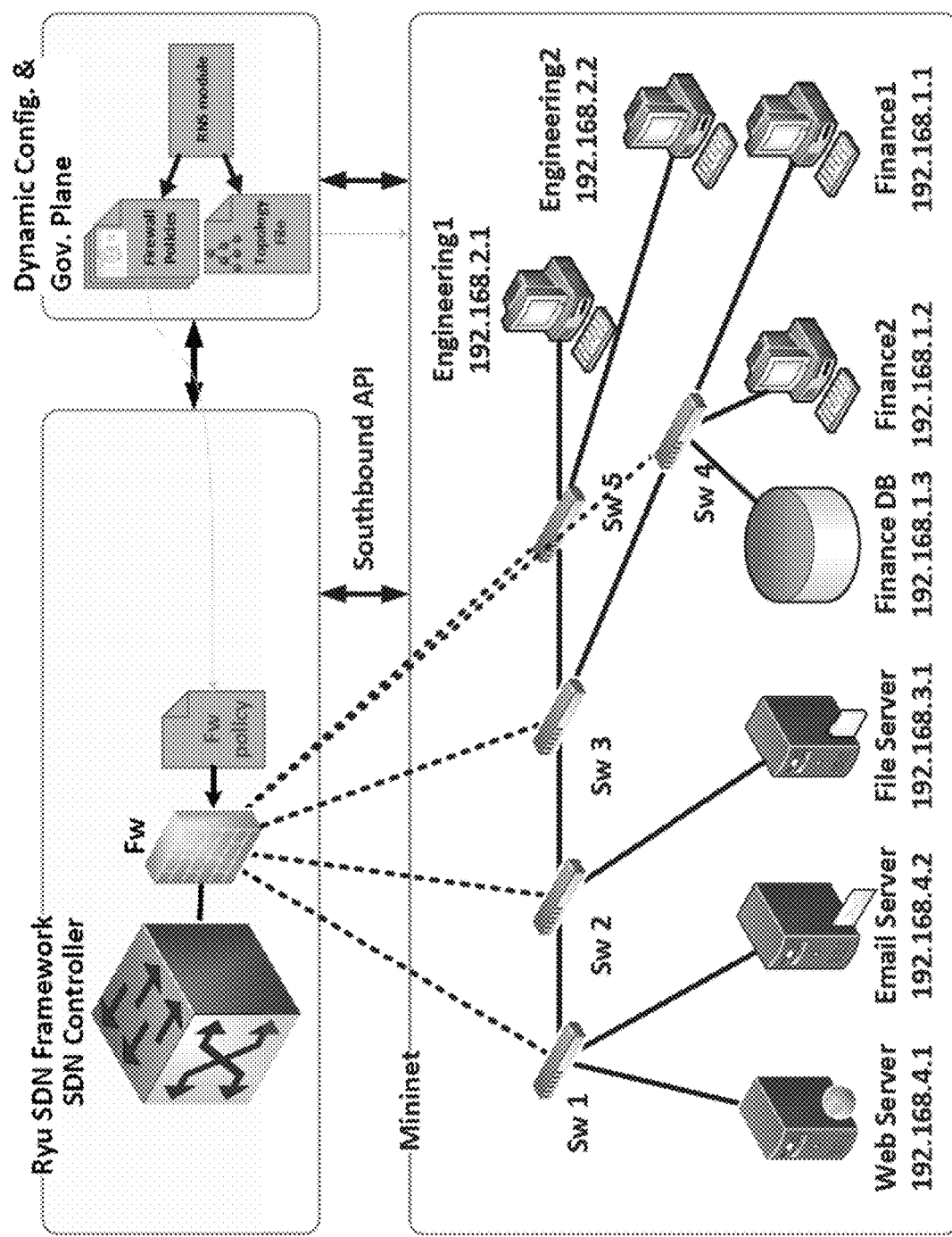
FIG. 12 is a diagram of an example of a first architecture in accordance with the system of FIG. 2.
Figure 13:
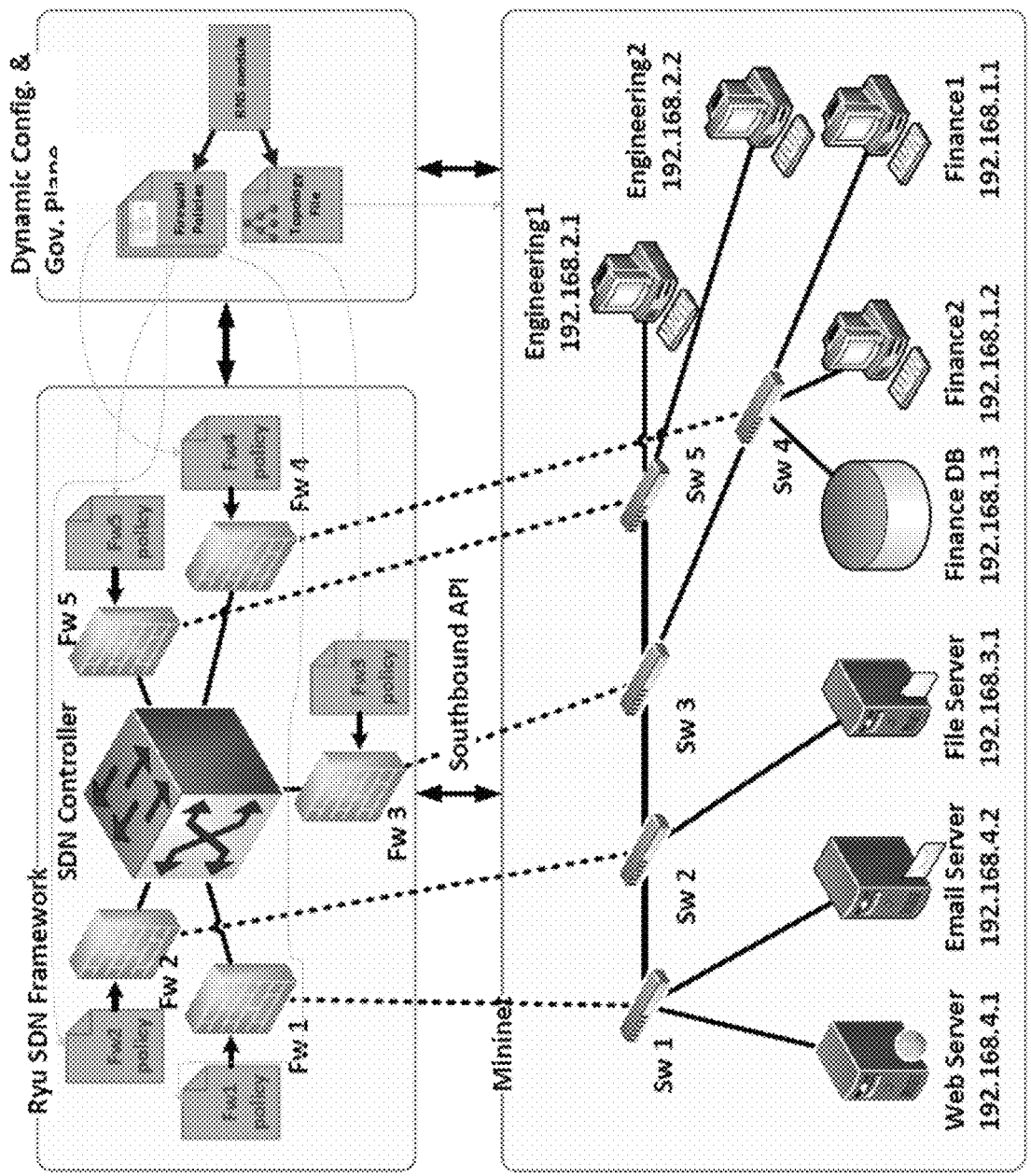
FIG. 13 is a diagram of an example of a second architecture in accordance with the system of FIG. 2.

The three exemplary architectures presented previously implement stateful firewalls, which keep track of connections state. Therefore, each firewall needs to follow the progress of a session by recording its state attributes and values. The firewall changes the state of the connection upon receiving a packet. The architectures presented previously record sessions' attribute values using state tables. In each architecture, each firewall has its own state table. Therefore, Architecture 1 has a single state table as shown in the example of FIG. 12. Architecture 2 has a state table for each firewall as shown in the example of FIG. 13. Architecture 3 has a state table at each firewall for each protocol as shown in the example of FIG. 14.

Figure 14:
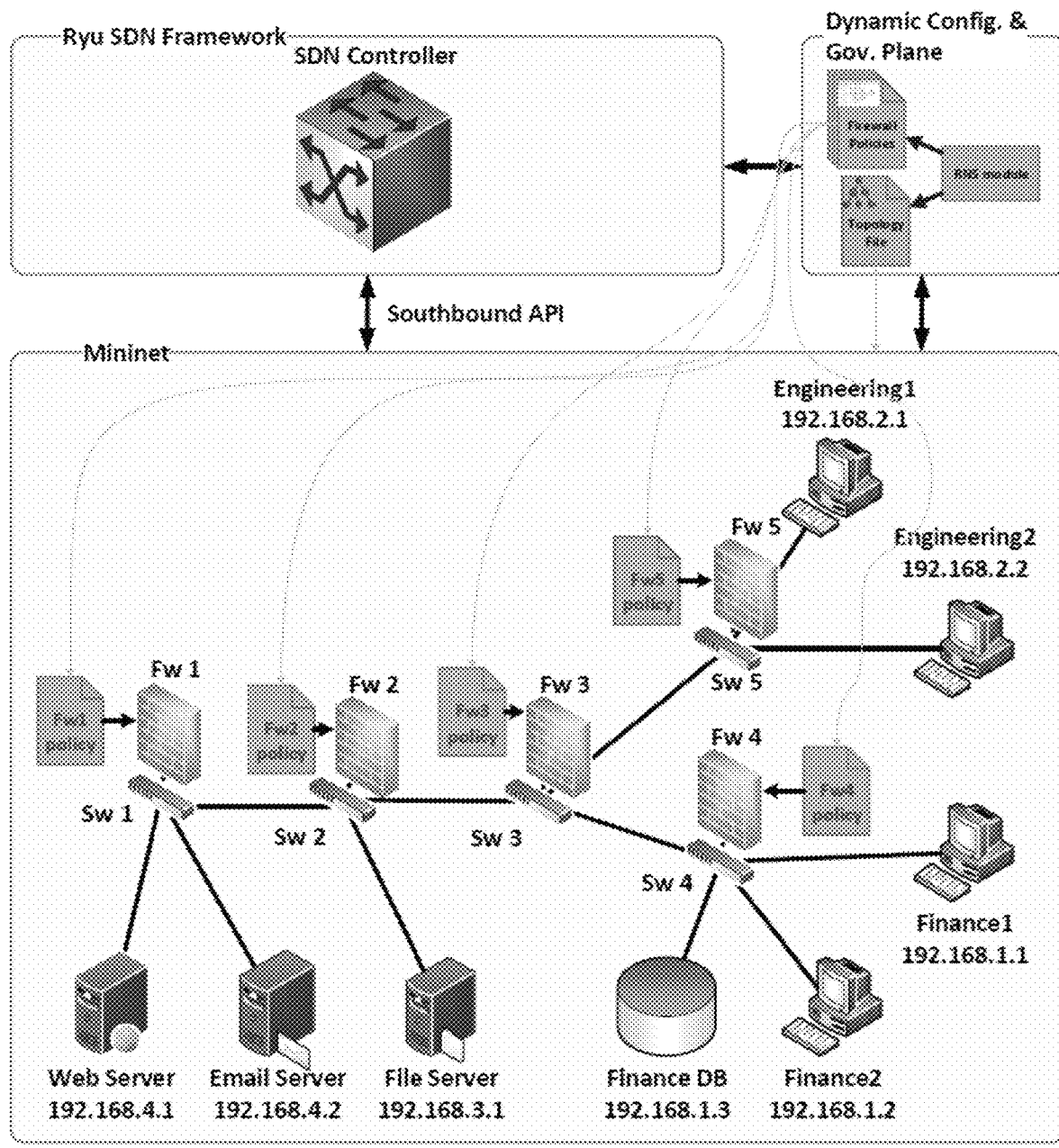
FIG. 14 is a diagram of an example of a third architecture in accordance with the system of FIG. 2.

The topology that is generated by the DCG plane is used to create the data plane architecture as shown in the examples of FIGS. 12, 13, and 14. The firewall policies are generated by the DCG plane. In the setup phase, each firewall fetches its policy. In Architecture 1, the single firewall reads its policy, processes it, and stores it in a policy holder, as shown in the example of FIG. 12. The same applies to each firewall in Architecture 2 as shown in the example of FIG. 13. However, in Architecture 3, as each switch registers with the controller, its policy is read and processed at the control plane, then pushed down to the flow tables of the switch at the data plane, as shown in the example of FIG. 14. In the operation phase, switches in Architectures 1 and 2 forward the first packets of every communication to the control plane for checking policy and connection state. Once a connection is established or denied by the policy, flow table entries are inserted in the switch to handle future packets. However, Architecture 3 checks policy and track state connection at the switch without the need for any communication with the control plane.

Internet Control Message Protocol (ICMP), User Datagram Protocol (UDP), and Transmission Control Protocol (TCP) communications are processed differently in the network. ICMP is a protocol that provides error and information messages for an IP-based network. The ping application uses ICMP messages to test connectivity. It sends an echo request to a host and waits for the echo reply, if no reply is received within a certain period of time, it times out and the remote host is declared unreachable. UDP is a connectionless protocol, which means there is no need to establish communication before sending data. In the end, the receiver host sends an acknowledgement to the sender host. TCP is a reliable connection-oriented protocol. TCP needs to establish the communication before sending data. The connection is established using the three-way handshake in which three packets are exchanged between the communicating hosts. The first packet in the handshake, sent by the first host, and is identified by setting the SYN bit. The second host replies with a second packet in which the SYN and ACK bits are set to indicate the acknowledgement of receiving the first packet and continuing the handshake. To which, the first host sends a third packet that has the ACK bit set to inform the other host of the establishment of the connection.

Architecture 1 is a single centralised firewall as shown in the example of FIG. 12. In this architecture, the firewall module creates a single firewall object responsible for enforcing the policies of all the switches in the data plane. To implement this architecture, a firewall application can be attached to the controller. In an example, the firewall application can have a policy holder, a state table, a package that has protocol handlers, a handler for each protocol, and a module that implements the switch functionality or to communicate commands to the switch. In this architecture, the state is handled by the firewall and has a single state table to keep track of all the connections for all the switches in the network. The same applies to the policy, in this architecture, there is a single policy that gets enforced. The policy of this firewall can be obtained from the several policies to be deployed at the internal control points calculated by the RNS algorithm. A state-space of the policies can be added as an attribute that indicates on what switch a rule is enforced. Hence, generating this global policy can be determined from the policies of the internal access control points calculated by the RNS algorithm.

Once the firewall application is initiated by the firewall module and the firewall object is created at the control plane, it reads and stores its policy that governs the decisions of all the switches. The policy generated by the DCG plane for this architecture is generally one single policy. When the topology is created, for example on Mininet, each switch registers with the controller and the firewall instructs it to add a single rule with low priority to forward packets to the controller. When a switch receives a packet, it matches the added rule and forwards the packet to the firewall. The firewall inspects the packet header and assigns it to the appropriate handler. For example, a first Internet Control Message Protocol (ICMP) packet in the communication is checked against the state table. If the state table has no entry for it, the policy is checked. If the policy denies the packet, the firewall instructs the switch to drop the packet and add an entry to its flow table to drop similar packets for a certain period of time. However, if the packet is allowed by the policy, the firewall adds an entry to the state table to handle the reply packet. It also instructs the switch to forward the packet and adds an entry to its flow table to forward similar packets for a certain period of time. When the reply packet arrives at the switch, the switch forwards the packet to the firewall. The firewall finds an entry in the state table, then updates the state table setting the connection state to established and instructs the switch to forward the packet and add an entry to its flow table. A UDP connection is handled in a similar way. The firewall handles the TCP protocol handshake in a similar way except the first packet has a SYN flag, the second packet has a SYN-ACK flag, and the third packet has an ACK flag.

The firewall prevents distributed denial-of-service (DDoS) attack by keeping track of request packets that have no reply, and if it passes a certain threshold, the firewall instructs the switch to add an entry to drop such packets and avoid overhead. In the data plane switches, each time the firewall adds an entry to the flow table, it sets an expiry time for its usage. Once an entry reaches its expiry time, it is removed from the flow table and the firewall gets a notification by an associated message. Once it receives this notification message, the firewall application removes the state table entries.

Accordingly, in Architecture 1, the determined network topology at block 210 is transformed into a firewall application that creates a single firewall object responsible for enforcing the security policies of the switches in the data plane. In enforcing the policies, the system makes use of the determined security policies that are associated with the control plane. Each time a switch gets a packet, it consults the firewall application at the control plane receive instructions for an action to take with respect to the packet.

Architecture 2 consists of multiple firewalls, where each one is responsible for managing a single switch, as shown in the example of FIG. 13. To implement this architecture, the firewall module can run the firewall application at the controller. The firewall application creates a firewall object for each switch. In an example, each firewall object has a policy holder, a state table, a package that has a protocol handler for each protocol, and a switch module that implements the switch functionality or communicates commands to a switch. In this architecture, the state is handled by each firewall separately as it has a state table to keep track of connections for the assigned switch. Compared to Architecture 1, this architecture applies the principle of separation of concerns; i.e., what concerns a switch is delegated to a firewall object.

In a setup phase, once a switch is created at the data plane and sends its feature to the controller, the firewall application creates a firewall object designated for this switch. A firewall object reads the policy that governs the decisions of its switch and stores it. When the switch receives a packet that is not matched by any entry table in its flow tables, it forwards it to its corresponding firewall. The firewall checks its state table, and, if needed, the policy, then it instructs the switch on how to handle the packet. When a communication is established, the firewall instructs the switch to add an entry to its entry table to handle similar future packets.

Architecture 3 is a distributed firewall architecture at the data plane. In this architecture, data plane switches are transformed into stateful firewalls using, for example, a BEBA software switch, as shown in the example of FIG. 14. In this way, switches handle firewall rules and keep track of the connection state without forwarding traffic to the controller. In this architecture, a state machine is used to handle each protocol and this is why each protocol is handled by a separate flow table. A state machine for a protocol forwards legitimate packets or drops packets according to their state transitions, and changes state if needed. If a packet is part of an established connection or a connection to be established, then it is forwarded by the firewall. Otherwise, it is dropped.

In Architecture 3, each protocol is handled by a separate flow table, which has a state table. Therefore, there is a state table for each of TCP, UDP, and ICMP protocols. Policies might involve rules that are specific to a protocol. Therefore, the policy at each switch can be split into policies, or sub-policies, associated with the flow tables of the protocols. Each flow table enforces the rules that are relevant to its protocol.

To implement Architecture 3, a controller application is associated with the controller. The application consists of a main class, and five more classes each is assigned to handle a flow table. The first class inserts rules in the first flow table, T0, to route packets to the appropriate flow table. The second class inserts flow entries in the flow table, T1, to handle ICMP packets. The third class inserts TCP packets rules in the flow table T2. The fourth class inserts rules in the flow table T3 to handle UDP packets. The last class inserts entries in the flow table T4, which is intended to keep track of what port is assigned to communication on each media access control (MAC) address.

In Architecture 3, the firewall application starts with the controller. When a switch sends a feature reply message to the controller (i.e., registers at the controller), the firewall object reads the policy associated with the switch and stores it. It then starts a first table object which inserts six rules in the first flow table, the first two rules are to drop every link layer discovery protocol (LLDP) and IPv6 packets. The third, fourth, and fifth rules forward ICMP, TCP, and UDP to tables T1, T2, and T3, respectively. The sixth rule forwards packets not matched by the above rules to T4.

Afterwards, the firewall module starts the second object, which is to prepare the flow table T1 to handle ICMP packets. The first command sets T1 into a stateful table. Then it sets the lookup-scope attributes, which are the attributes that the switch extracts from the packet and match with the state table entries. The lookup-scope in the ICMP case is the tuple (source_ip, destination_ip). The next attributes to be set at the switch are the update-scope attributes, which are the attributes used by the switch to update the state table. In ICMP, the update-scope is the tuple (destination_ip, source_ip). Finally, it is the step of inserting entries in the XFSM flow table. The first entry is to handle an established connection. It checks if the state found in the state table is 1 (i.e., established), then the switch forwards the packet to T4 to be forwarded to the right port, and update the state for the other direction to 1 (i.e., established). This rule is given the highest priority. Then the object checks the policy rules and inserts flow entries for the rules that are related to ICMP or "all" packets. These rules are used to match the first packets in a communication (i.e., state 0). An allow rule passes the packet to T4 to be forwarded and updates the state for the other direction to 1, otherwise, it drops the packet. An allow rule is given a medium priority and a deny rule is given a low priority. A first packet is processed by the state table which does not match any entry and is given the default state 0. The XFSM table processes the packet to either forward it and update the state table, or to drop the packet. The third and fourth objects have similar functionality to handle TCP and UDP packets. The fifth object is intended to update the T4 entries, which are for keeping track of the ports associated with every MAC address.

The present inventors conducted example experiments to verify the NRS algorithm of the present embodiments. The topology used in the example experiments was the topology generated by the RNS module 128 in the DCG plane for a network composed of two engineering workstations (Engineering1 and Engineering2), two finance workstations and a database (Finance1, Finance2, and Finance DB, respectively), a File server, a Web server, and an Email server. The high-level policies of these resources are the following: Engineering1 and Engineering2 belong to the engineering department and limit access to resources belonging to the respective department. Finance1, Finance2, and Finance DB have a similar policy applied to the finance department. The File server allows access to resources belonging to internal departments (i.e., engineering and finance) only. The Web server and Email server allow access to internal resources and allow limited access to outer resources (i.e., HTTP and SMTP protocols).

The above requirements are translated into low level policies and then fed to the RNS module 128 in the DCG plane. The DCG plane generates the topology as shown in the examples of FIGS. 12, 13, and 14. It also generates firewall policies.

To test the dynamic nature of the network, two admin resources were added to the set of resources. The policy of these resources is to allow access to traffic generated from the admin resources only. These resources are to gain access to every resource in the network and this is achieved by updating the policies of all network resources. The DCG plane recalculates the topology and generates updated firewall policies.

One of the criteria to compare the architectures is the cost to setup the network. The cost is measured by the number of packets exchanged between the control plane and the data plane in the setup phase. In the example experiments, for Architectures 1 and 2, 46 packets are exchanged to complete the setup. Architecture 3 took on average 1508 packets. 10 tests were performed on Architecture 3 and the minimum number of packets exchanged was 1459 and the maximum number was 1742. This is due to the fact that in Architectures 1 and 2, the only messages exchanged are the setup messages, while in Architecture 3, besides setup messages, the messages for setting stateful tables, inserting flow table entries are also exchanged at this stage.

After the setup of the environment, the first test performed on all architectures is whether the policies are enforced as expected for the ICMP protocol, and for that, a reachability test was performed between all the resources in the network. Architectures 1, 2, and 3 all have the same result as shown in the Reachability Test Results I example shown below. The reachability test is done by the command pingall, where every host tries to ping every other host in the data plane. In the first line in the result, a label at each line (i.e., eng1) can be seen, which is the name of the resource initiating the ping request. After the arrow→a resource name (i.e., eng2) indicates a successful communication with that resource (i.e., reply), and an x indicates a failed communication (i.e., blocked). For example, eng1 is able to access eng2, file, web, and email while failing to access fin1, fin2, and finDB.

| Reachability Test Results I |
| --- |
| mininet > pingall |
| *** Ping: testing ping reachability |
| eng1 -> eng2 X X X file web email |
| eng2 -> eng1 X X X file web email |
| fin1 -> X X fin2 finDB file web email |
| fin2 -> X X fin1 finDB file web email |
| finDB -> X X fin1 fin2 file web email |
| file -> X X X X X web email |
| web -> X X X X X X email |
| email -> X X X X X X web |
| *** Results: 51% dropped (27/56 received) |
| mininet > |

The response time or latency test measures the time it takes to get a reply for a request. The experiments carried out this test by sending several ICMP packets using ping and measured the response time for the traffic originating from Engineering1 to Web server.

Figure 15:
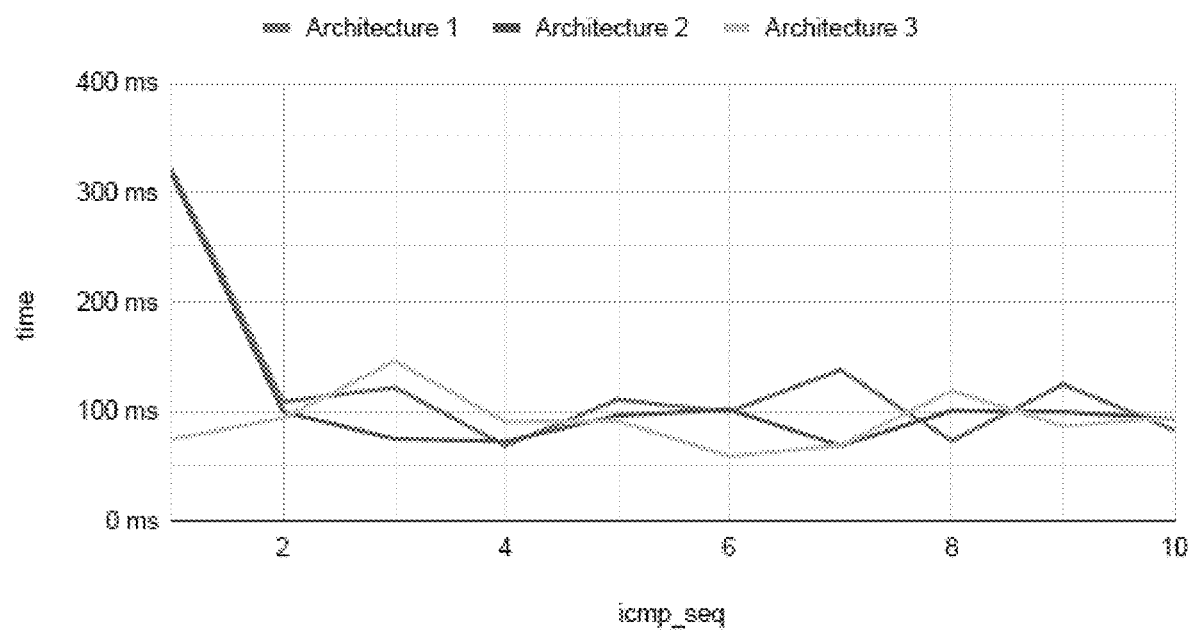
FIG. 15 is a chart showing response time for 10 Internet Control Message Protocol (ICMP) packets in accordance with example experiments.

In FIG. 15, the results for only 10 ICMP packets are shown, as the results are the same for a number above 10 packets. FIG. 15 shows that the first packet took about the same time for Architectures 1 and 2 and less time for Architecture 3. The reason is that switches in Architectures 1 and 2 do not have entries in their flow tables to handle the packet, and the packet is forwarded to the controller. On the other hand, switches in Architecture 3 have entries in their flow tables to handle the packet, which reduces the time to handle the first packet. Moreover, Architecture 1 and Architecture 2 needed to exchange 32 packets between data plane switches and the controller while Architecture 3 does not need to exchange any packets. Architectures 1, 2, and 3 show similar response times for the subsequent packets. The reason is that the subsequent packet switches already have entries in all architectures to handle the packets that follow the first packet.

Figure 17:
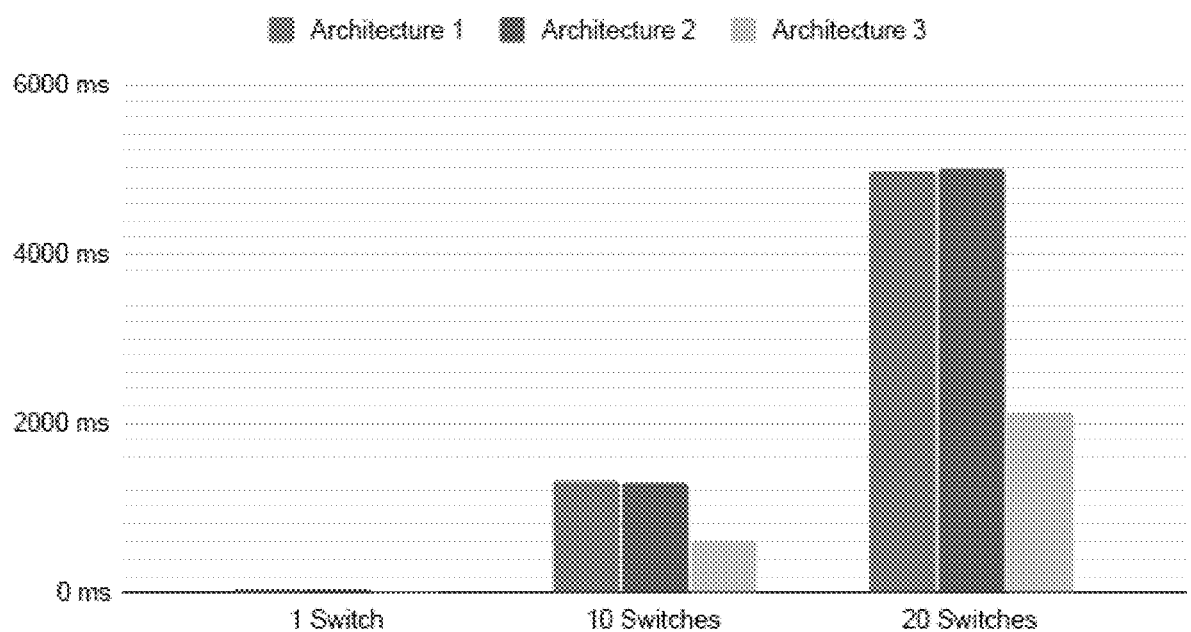
FIG. 17 is a chart showing response time for topologies of 1, 10, and 20 switches in accordance with the example experiments.

An important factor impacting the response time is the number of hosts trying to communicate in a short time interval and several sessions are being established. For this purpose, the experiments performed the same tests as shown in FIG. 15 measuring the response time for the traffic originating from Engineering1 to Web server while there are different communications going in the network. FIG. 17 presents the results for 10 ICMP packets. It shows that the first packet takes almost the same time for Architectures 1 and 2 and less time for Architecture 3 for the same reason presented above. Architectures 1, 2, and 3 show similar response times that is due to the fact that subsequent packet switches already have entries in all architectures to handle subsequent packets to the first packet of a new connection.

To see the difference in response time between the three architectures more clearly, three different topologies were generated with the Engineering1 on one end and the Web server on the other end. The three topologies consist of 1, 10, and 20 switches between these resources. These switches enforce the same policy. In all tests, Engineering1 sends a single ICMP packet (i.e., ping request) and measured the response time. FIG. 17 shows the average results for 10 tests. The average times for the case of a single switch for Architectures 1, 2, and 3 are 30.31 ms, 29.5 ms, and 1.18 ms, respectively. The average times for the case of 10 switches for Architectures 1, 2, and 3 are 1312.2 ms, 1300.3 ms, and 607.5 ms, respectively. Finally, the average times for the case of 20 switches for Architecture 1, 2, and 3 are 4963.3 ms, 5003 ms, and 2116.5 ms, respectively.

Figure 18:
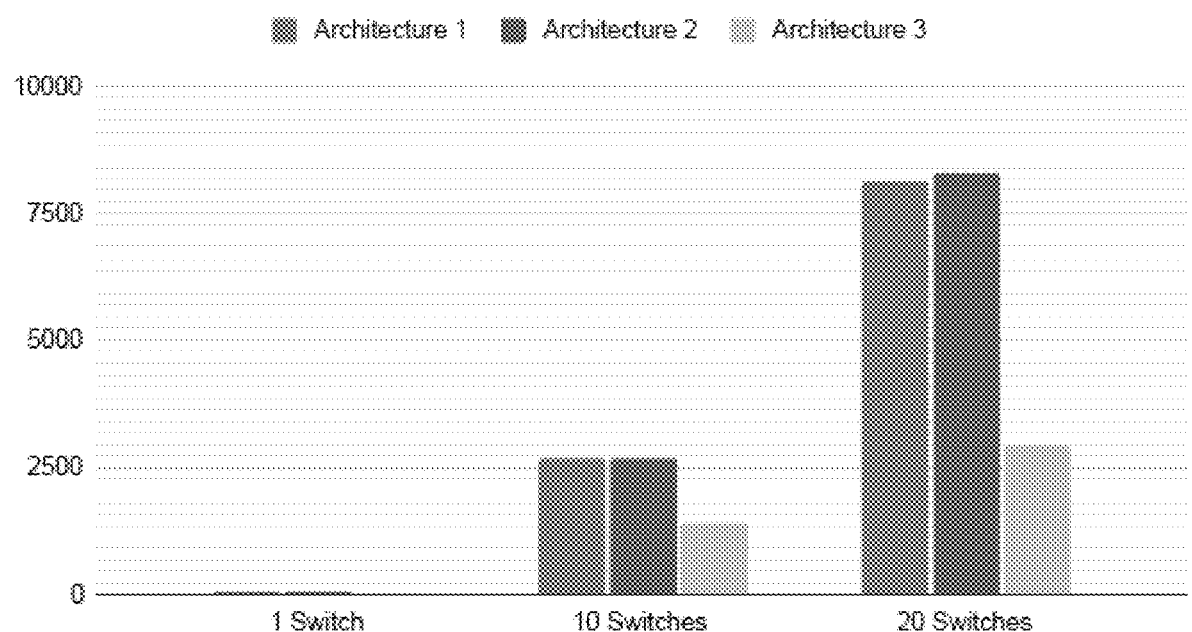
FIG. 18 is a chart showing response time for topologies of 1, 10, and 20 switches for several sessions in accordance with the example experiments.

The above test was performed while there was ongoing communication in the network. FIG. 18 shows the average results for 10 tests. The average times for the case of a single switch for Architectures 1, 2, and 3 are 46.530 ms, 42.140 ms, and 0.176 ms, respectively. The average times for the case of 10 switches for Architectures 1, 2, and 3 are 2691.6 ms, 2676.3 ms, and 1409.0 ms, respectively. Finally, the average times for the case of 20 switches for Architecture 1, 2, and 3 are 8123.1 ms, 8278.6 ms, and 2924.7 ms, respectively. It is clear from FIGS. 18 and 19 that Architectures 1, and 2 has comparable response time and Architecture 3 has significantly better time-performance.

One of the tests performed was to compare the three architectures is network bandwidth. Network bandwidth is the maximum rate or volume of data that can be transferred on a link per unit of time. The bandwidth test is done by performing a TCP communication using iPerf between the selected hosts (i.e., eng1 and web). The result is shown in Table II and broken down into 0.5 second intervals in FIG. 15. Note that bandwidth test between virtual hosts depends on the host machine processing speed. The bandwidth for the virtual host in Mininet varies because of the host machine running processes and processor load at a given time. Therefore, the three architectures will not vary in bandwidth as they use the same environment with the same switches and links.

TABLE II

|  | Interval | Transfer | Bandwidth |
| --- | --- | --- | --- |
| Architecture 1 | 0.0-20.4 sec | 512 KBytes | 206 Kbits/sec |
| Architecture 2 | 0.0-19.0 sec | 512 KBytes | 221 Kbits/sec |
| Architecture 3 | 0.0-20.4 sec | 512 KBytes | 205 Kbits/sec |

For a TCP communication, Architecture 1 and Architecture 2 exchange 154 packets between the data plane and control plane while Architecture 3 does not exchange any packet.

Figure 16:
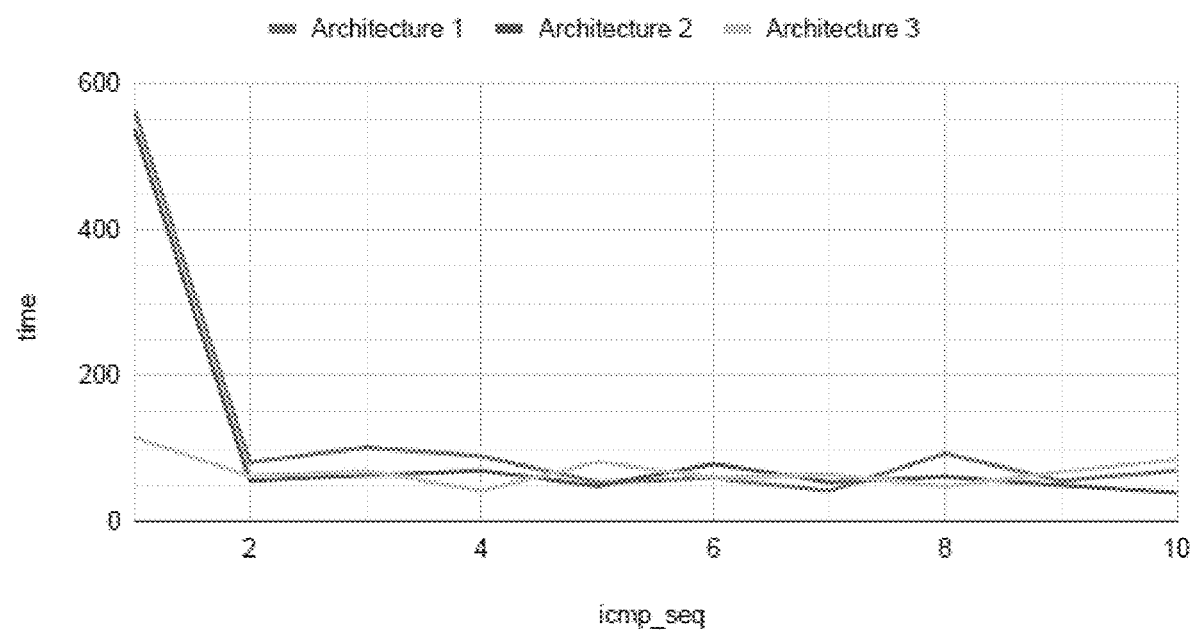
FIG. 16 is a chart showing response time for 10 Internet Control Message Protocol (ICMP) packets of several sessions in accordance with the example experiments.

Latency variation or jitter is the variance in delay time or latency between packets' arrival. The jitter test is done by performing a UDP communication using iPerf between the selected hosts (i.e., eng1 and web). The result is shown in Table III, which is broken down into 0.5 second intervals in FIG. 16. Notice that the three architectures have very similar jitter and that it is not affected by the difference in architectures for the same reasons discussed for the bandwidth. Architecture 1 and Architecture 2 exchange 45 packets in UDP connection while 0 packets are exchanged in Architecture 3.

TABLE III

|  | Interval | Transfer | Bandwidth | Jitter |
| --- | --- | --- | --- | --- |
| Architecture 1 | 0.0-8.8 sec | 1.09 MBytes | 1.05 Mbits/sec | 17.349 ms |
| Architecture 2 | 0.0-9.1 sec | 1.14 MBytes | 1.05 Mbits/sec | 16.792 ms |
| Architecture 3 | 0.0-9.9 sec | 1.25 MBytes | 1.06 Mbits/sec | 15.962 ms |

Looking at the tests done on the operation phase, which are the latency, bandwidth, and jitter, one can notice the following. First, results are similar for bandwidth and jitter tests for the three architectures as they are based on the environment consisting of topology, switches, and links which are the same for the three architectures. Second, the result for the response time is high in Architecture 1 and Architecture 2 and low in Architecture 3. The reason for this is the time Architectures 1 and 2 take to add entries in the flow table of the switches in response to the first packet. Finally, notice that for all these tests, Architecture 1 and Architecture 2 exchange packets between the data plane and the control plane while Architecture 3 does not exchange any packet.

To assess the effect of a change, the experiments added two administration workstations. These workstations can access all resources and they allow access between themselves and deny everything else. This case is used to re-execute the RNS module 128 and generate new firewall policies and an updated topology. The Mininet topology is updated on the fly as explained herein. To compare the response for the update by the three architectures, the update cost of each architecture was evaluated by counting the number of exchanged packets between the control and data plane to fulfil the update. In the example, Architectures 1 and 2 exchanged 54 packets between control and data planes. Architecture 3 exchanged 1670 packets on average. The difference is huge between Architectures 1 and 2 on one side and Architecture 3 on the other side. A reachability test of all the architectures was also performed after the topology update. The result for the architecture 1, 2, and 3 are shown in Reachability Test Results Il.

| Reachability Test Results II |
| --- |
| [mininet > pingall<br>*** Ping: testing ping reachability<br>eng1 -> eng2 X X X file web email X X<br>eng2 -> eng1 X X X file web email X X<br>fin1 -> X X fin2 finDB file web email X X<br>fin2 -> X X fin1 finDB file web email X X<br>finDB -> X X fin1 fin2 file web email X X<br>file -> X X X X X web email X X<br>web -> X X X X X X email X X<br>email -> X X X X X X web X X<br>admin1 -> eng1 eng2 fin1 fin2 finDB file web email admin2<br>admin2 -> eng1 eng2 fin1 fin2 finDB file web email admin1<br>*** Results: 50% dropped (45/90 received)<br>mininet > |

The RNS algorithm is a product family approach for policy-based network design. It uses the policies of a set of resources to segment them to achieve the best access control security. Three different example architectures are provided for implementing the RNS algorithm into SDN. These architectures were compared. There was a difference in cost between setup and operation phases. Architectures 1 and Architecture 2 have a low setup cost but high operational cost, while it is the opposite for Architecture 3. Hence, there is a trade-off between the time to setup proper routing mechanisms and the time for normal communication operation. It becomes obvious that if an environment is high in traffic but more stable, then Architecture 3 is more suitable. However, if the topology is more dynamic compared to traffic volume, then Architectures 1 and 2 are more suitable.

Architecture 1 and Architecture 2 are similar in terms of where the firewalls reside, however they are different in terms of design. Architecture 2 is more suitable for modifiability than Architecture 1 as it is designed based on the separation of concerns principle and gives more flexibility in updating policies when we need to update the affected policies only rather than updating the single policy that governs the whole network traffic. Moreover, for a given packet arriving at the controller, there is a need to go through a limited number of rules rather than going through all rules for all switches in the network.

Many security threats or attacks can target an SDN environment affecting the control plane, application plane, southbound API, northbound API, or data plane, which applies to all architectures. Architecture 3 by being stateful at the data plane, by limiting the number of packets exchanged between the control and data plane, and by handling traffic locally at the switch, is more resilient to face vulnerabilities and SDN attacks targeting the controller, northbound API, and southbound API.

To improve the performance of the DCG plane, defensive depth can be used at the control plane, for reactive and quick changes to only update policies without changing the structure of the whole topology. Moreover, topology changes can be done periodically or at downtime as intended by the network administrator.

The DCG plane can be combined with other approaches to improve the security of an SDN environment. Intrusion Prevention Systems (IPS) for SDN can be used, which inspects traffic going through switches to detect attacks. Such an approach can be used with the present embodiments to secure SDN. Segmentation for resources is provided that supports IPS in order to have a better view of the traffic going through the network. Moreover, in the case of IPS, detecting clandestine entry point or unusual network traffic, the use of DCG plane to recalculate policies and topology to isolated infected resources or segments preventing the spread of infection.

The RNS algorithm of the present embodiment can be used to structure the control plane using distributed controllers, such as ONOS, in addition to structuring the data plane. In some cases, the RNS module 128 can also scrutinize the data that flows through the network. In this case, the RNS module 128 would use ontologies and organized data analysis techniques to develop an awareness about the security situation that might play a role in the configuration of the network.

While the present disclosure generally refers to security of a computer network, it is understood that the present embodiments can be applied to any network with varying security requirements; for example, a network of social-media contacts, or 5G networks.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method for determining an arrangement of network resources to provide network access security, the network having one or more access points to externally access the network, each network resource having an associated security policy, the method executed on at least one processing unit, the method comprising:
   receiving information of the network resources and the one or more access points;
   assigning a weight to each network resource based on the associated security policy, where a greater weighting corresponds to a requirement for a greater level of security;
   segmenting the network resources into subsets, where a network resource is associated with a given subset if an operator acting on the network resource with other network resources in the subset has equal or more combined weight than the combined weight of the operator acting on the network resource with other network resources not in the subset;
   generating a network topology by adding subsets to nodes in the network topology in descending order by weight until one of the one or more access points is reached, where security policies at a given node are a refinement of the security policies at an ancestor node of the given and where vertices between nodes are firewalled; and
   outputting the network topology for implementation.

2. The method of claim 1, wherein the operator comprises a greatest common divisor (GCD) operator.

3. The method of claim 1, further comprising transforming each policy into a set of rules that are atomic and based on security requirements or security situation, and wherein the weight of each security policy is the sum of the weights of the atomic rules of such security policy.

4. The method of claim 3, wherein the atomic rule is modelled as a transition relation from a starting state to one or more end states.

5. The method of claim 1, wherein the security policies for a plurality of the network resources are combined into a family of policies.

6. The method of claim 1, wherein the firewall at each node of the network topology comprises a single and centralised stateful firewall at a control plane.

7. The method of claim 1, wherein the firewall at each node of the network topology comprises a plurality of distributed stateful firewalls located at the control plane.

8. The method of claim 1, wherein the firewall at each node of the network topology comprises a plurality of distributed stateful firewalls located at the data plane.

9. A system for determining an arrangement of network resources to provide network access security, the network having one or more access points to externally access the network, each network resource having an associated security policy, the system comprises at least one processor and a memory in communication with the at least one processing unit processor and having executable instructions stored thereon, the at least one processing unit configured to execute:
   an input module to receive information of the network resources and the one or more access points: a weighting module to assign a weight to each network resource based on the associated security policy, where a greater weighting corresponds to a requirement for a greater level of security;

a segmentation module to segment the network resources into subsets, where a network resource is associated with a given subset if an operator acting on the network resource with other network resources in the subset has equal or more combined weight than the combined weight of the operator acting on the network resource with other network resources not in the subset;

a graph module to generate a network topology by adding subsets to nodes in the network topology in descending order by weight until one of the one or more access points is reached, where security policies at a given node are a refinement of the security policies at an ancestor node of the given and where vertices between nodes are firewalled; and an output module to output the network topology for implementation by the network.

10. The system of claim 9, wherein the operator comprises a greatest common divisor (GCD) operator.

11. The system of claim 9, wherein each policy is transformed into a set of rules that are atomic and based on security requirements or security situation, and wherein the weight of each security policy is the sum of the weights of the atomic rules of such security policy.

12. The system of claim 11, wherein the atomic rule is modelled as a transition relation from a starting state to one or more end states.

13. The system of claim 9, wherein the security policies for a plurality of the network resources are combined into a family of policies.

14. The system of claim 9, wherein the weighting module, the segmentation module, and the graph module conceptually operate on a dynamic configuration and governance (DCG) plane, and wherein the firewall at each node of the network topology comprises a single and centralised stateful firewall at a control plane.

15. The system of claim 9, wherein the weighting module, the segmentation module, and the graph module conceptually operate on a dynamic configuration and governance (DCG) plane, and wherein the firewall at each node of the network topology comprises a plurality of distributed stateful firewalls located at the control plane.

16. The system of claim 9, wherein the weighting module, the segmentation module, and the graph module conceptually operate on a dynamic configuration and governance (DCG) plane, and wherein the firewall at each node of the network topology comprises a plurality of distributed stateful firewalls located at the data plane.

* * * * *